(12) United States Patent  
Taninaka

(10) Patent No.: US 7,716,440 B2
(45) Date of Patent: May 11, 2010

(54) STORAGE SYSTEM AND MANAGEMENT METHOD THEREOF

(75) Inventor: Dai Taninaka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 428 days.

(21) Appl. No.: 11/340,629

(22) Filed: Jan. 27, 2006

(65) Prior Publication Data

US 2007/0124551 A1 May 31, 2007

(30) Foreign Application Priority Data

Nov. 30, 2005 (JP) .............................. 2005-345409

(51) Int. Cl.
  *G06F 12/00* (2006.01)
  *G06F 13/00* (2006.01)
  *G06F 13/28* (2006.01)
(52) U.S. Cl. ........................ 711/165; 711/113; 711/170; 707/204; 709/217
(58) Field of Classification Search ................. 711/170, 711/113, 165; 709/217; 707/204
See application file for complete search history.

(56) References Cited

U.S. PATENT DOCUMENTS

| 4,720,782 | A | * | 1/1988 | Kovalcin ..................... 700/83 |
| 5,276,867 | A |   | 1/1994 | Kenley et al. |
| 5,394,527 | A | * | 2/1995 | Fakhruddin et al. ........... 710/59 |
| 5,978,815 | A |   | 11/1999 | Cabrera et al. |
| 6,085,262 | A |   | 7/2000 | Sawada |
| 6,269,382 | B1 |  | 7/2001 | Cabrera et al. |
| 6,889,232 | B2 |  | 5/2005 | Pudipeddi et al. |
| 2002/0046215 | A1 | | 4/2002 | Petrocelli |
| 2004/0039891 | A1 | | 2/2004 | Leung et al. |
| 2004/0078542 | A1 | * | 4/2004 | Fuller et al. ................. 711/172 |
| 2004/0193760 | A1 | | 9/2004 | Matsunami et al. |
| 2005/0050268 | A1 | * | 3/2005 | Yoshida ...................... 711/114 |
| 2005/0071559 | A1 | | 3/2005 | Tamura et al. |
| 2005/0097126 | A1 | | 5/2005 | Cabrera et al. |
| 2006/0059172 | A1 | * | 3/2006 | Devarakonda .............. 707/100 |

FOREIGN PATENT DOCUMENTS

JP 2005107645 A 4/2005

* cited by examiner

*Primary Examiner*—Stephen C Elmore
*Assistant Examiner*—Mark A Giardino, Jr.
(74) *Attorney, Agent, or Firm*—Brundidge & Stanger, P.C.

(57) ABSTRACT

This storage system has a first disk array device for providing a first volume that stores data transmitted from a host system, a second disk array device for providing a second volume that is virtualized with the first disk array device, and a management terminal for managing the first disk array device; wherein the first disk array device includes a first management unit for managing volume information of the virtualized volume that was virtualized in the first disk array device by being mapped with the second volume; and a first transmission unit for transmitting, based on an external operation, the volume information of the virtualized volume managed with the first management unit to the management terminal; and wherein the management terminal includes a second management unit for managing the volume information of the virtualized volume transmitted from the first transmission unit.

18 Claims, 16 Drawing Sheets

STORAGE SYSTEM AND MANAGEMENT METHOD THEREOF

CROSS-REFERENCES TO RELATED APPLICATIONS

This application relates to and claims priority from Japanese Patent Application No. 2005-345409, filed on Nov. 30, 2005, the entire disclosure of which is incorporated herein by reference.

BACKGROUND OF THE INVENTION

The present invention relates to a storage system and management method thereof, and, for instance, is suitably employed in a storage system which virtualizes a volume of a certain disk array device with another disk array device.

Conventionally, a storage system which directly connects a disk array device to a host system and stores data in such disk array device was widely prevalent. Thus, in order for the host system to access data of a disk array device connected to another host system, the host system had to be connected, via such other host system, to the disk array device connected to the other host system.

Whereas, pursuant to the advancement of network technology in recent years and the exponential increase in the data volume to be handled by storage systems, the host system for inputting and outputting data and the storage system for storing data are being decentralized, and a storage system has been developed where a plurality of host systems are connected to disk array devices via a network, and the respective host systems share the data of the respective disk array devices.

As an example of such a storage system, there are, for example, a SAN (Storage Area Network) storage system that connects a host system and a disk array device via a SAN and provides block access service to the host system, and a NAS (Network Attached Storage) storage system that connects a host system and a disk array device via an IP network or the like and provides file access service to the host system.

Further, in recent years, proposed is a storage system having a first disk array device connected to a host system and a second disk array device connected to this first disk array device, wherein a plurality of disk array devices are integrated by mapping a logical volume of a second disk array device to a virtual volume of the first disk array device, and the first disk array device provides the logical volume of the second disk array device to the host system as though it is its own logical volume (e.g. refer to Japanese Patent Laid-Open Publication No. 2005-107645).

SUMMARY OF THE INVENTION

Meanwhile, with the foregoing storage system, although there is an advantage in that a plurality of disk array devices can be unified, when the logical volume of the second disk array device is mapped to the virtual volume of the first disk array device, for each logical volume of the second disk array device, the capacity based on such logical volume must be secured in the cache memory or shared memory of the first disk array device. Thus, there is a problem in that a cache memory and shared memory of a capacity corresponding to the logical volumes of all disk array devices must be prepared.

And, based on compliance regulations and the like, this kind of logical volume of the second disk array device must be stored such that it can be input and output for a predetermined period. Nevertheless, since this is a logical volume which the host system does not the I/O processing of data, it will be a waste of storage resources to secure the capacity corresponding to the logical volume in the cache memory and shared memory of the disk array device for all logical volumes of the second disk array device.

The present invention was devised in consideration of the foregoing points, and an object thereof is to provide a storage system and management method thereof capable of preventing the waste of storage resources.

In order to achieve the foregoing object, the present invention provides a storage system having a first disk array device for providing a first volume that stores data transmitted from a host system, a second disk array device for providing a second volume that is virtualized with the first disk array device, and a management terminal for managing the first disk array device; wherein the first disk array device includes a first management unit for managing volume information of the virtualized volume that was virtualized in the first disk array device by being mapped with the second volume; and a first transmission unit for transmitting, based on an external operation, the volume information of the virtualized volume managed with the first management unit to the management terminal; and wherein the management terminal includes a second management unit for managing the volume information of the virtualized volume transmitted from the first transmission unit.

Accordingly, without having to secure, in a storage resource such as a cache memory or shared memory of the first disk array device, the capacity corresponding to a virtualized volume that needs to be stored such that it can be input or output for a predetermined period based on compliance regulations and the like, and which is not subject to the I/O processing of data by the host system, the capacity to be secured in the storage resource corresponding to the virtualized volume can be released.

Further, the present invention also provides a management method of a storage system having a first disk array device for providing a first volume that stores data transmitted from a host system, a second disk array device for providing a second volume that is virtualized with the first disk array device, and a management terminal for managing the first disk array device, including: a first stop for managing, with a first management unit, volume information of the virtualized volume that was virtualized in the first disk array device by being mapped with the second volume; a second step for transmitting, based on an external operation, the volume information of the virtualized volume managed with the first management unit at the first step to the management terminal; and a third step for managing, with a second management unit, the volume information of the virtualized volume transmitted at the second step.

Accordingly, without having to secure, in a storage resource such as a cache memory or shared memory of the first disk array device, the capacity corresponding to a virtualized volume that needs to be stored such that it can be input or output for a predetermined period based on compliance regulations and the like, and which is not subject to the I/O processing of data by the host system, the capacity to be secured in the storage resource corresponding to the virtualized volume can be released.

Moreover, the present invention also provides a storage system having a disk array device including a plurality of volumes for storing data transmitted from a host system, a switch device for transmitting the data from the host system to the disk array device, and a management terminal to be connected to the switch device; wherein the switch device includes a virtualized volume to be provided to the host system, and a management unit; wherein the plurality of volumes of the disk array device include an online volume mapped to the virtualized volume and an offline volume mapped to the virtualized volume; wherein the management unit manages information relating to the online volume; and wherein the management terminal manages information relating to the offline volume.

Accordingly, without having to secure, in a storage resource such as a cache memory or shared memory of the first disk array device, the capacity corresponding to a virtualized volume that needs to be stored such that it can be input or output for a predetermined period based on compliance regulations and the like, and which is not subject to the I/O processing of data by the host system, the capacity to be secured in the storage resource corresponding to the virtualized volume can be released.

In addition, the present invention also provides a storage system having a first disk array device connected to a host system, a second disk array device to be connected to the first disk array device, and a management terminal to be connected to the first disk array device; wherein the first disk array device includes a plurality of virtualized volumes to be provided to the host system, and a management unit; wherein the second disk array device includes an online volume mapped to a virtualized volume among the plurality of virtualized volumes, and an offline volume not mapped to any of the plurality of virtualized volumes; wherein information relating to the online volume is managed with the management unit; and wherein information relating to the offline volume is managed with the management terminal.

Accordingly, without having to secure, in a storage resource such as a cache memory or shared memory of the first disk array device, the capacity corresponding to a virtualized volume that needs to be stored such that it can be input or output for a predetermined period based on compliance regulations and the like, and which is not subject to the I/O processing of data by the host system, the capacity to be secured in the storage resource corresponding to the virtualized volume can be released.

Thus, since the present invention provides a management method of a storage system having a first disk array device for providing a first volume that stores data transmitted from a host system, a second disk array device for providing a second volume that is virtualized with the first disk array device, and a management terminal for managing the first disk array device, which manages, with a first management unit, volume information of the virtualized volume that was virtualized in the first disk array device by being mapped with the second volume; transmits, based on an external operation, the volume information of the virtualized volume managed with the first management unit at the first step to the management terminal; and manages, with a second management unit, the volume information of the virtualized volume transmitted at the second step, without having to secure, in a storage resource such as a cache memory or shared memory of the first disk array device, the capacity corresponding to a virtualized volume that needs to be stored such that it can be input or output for a predetermined period based on compliance regulations and the like, and which is not subject to the I/O processing of data by the host system, the capacity to be secured in the storage resource corresponding to the virtualized volume can be released. As a result, it is possible to realize a storage system and manufacturing method thereof capable of preventing the waste of storage resources.

Further, since the present invention provides a storage system having a disk array device including a plurality of volumes for storing data transmitted from a host system, a switch device for transmitting the data from the host system to the disk array device, and a management terminal to be connected to the switch device; wherein the switch device includes a virtualized volume to be provided to the host system, and a management unit; the plurality of volumes of the disk array device include an online volume mapped to the virtualized volume and an offline volume mapped to the virtualized volume; the management unit manages information relating to the online volume; and the management terminal manages information relating to the offline volume, without having to secure, in a storage resource such as a cache memory or shared memory of the first disk array device, the capacity corresponding to a virtualized volume that needs to be stored such that it can be input or output for a predetermined period based on compliance regulations and the like, and which is not subject to the I/O processing of data by the host system, the capacity to be secured in the storage resource corresponding to the virtualized volume can be released. As a result, it is possible to realize a storage system and manufacturing method thereof capable of preventing the waste of storage resources.

DETAILED DESCRIPTION OF THE INVENTION

An embodiment of the present invention is now described in detail with reference to the drawings.

(1) First Embodiment

(1-1) Configuration of Storage System According to First Embodiment

Figure 1:
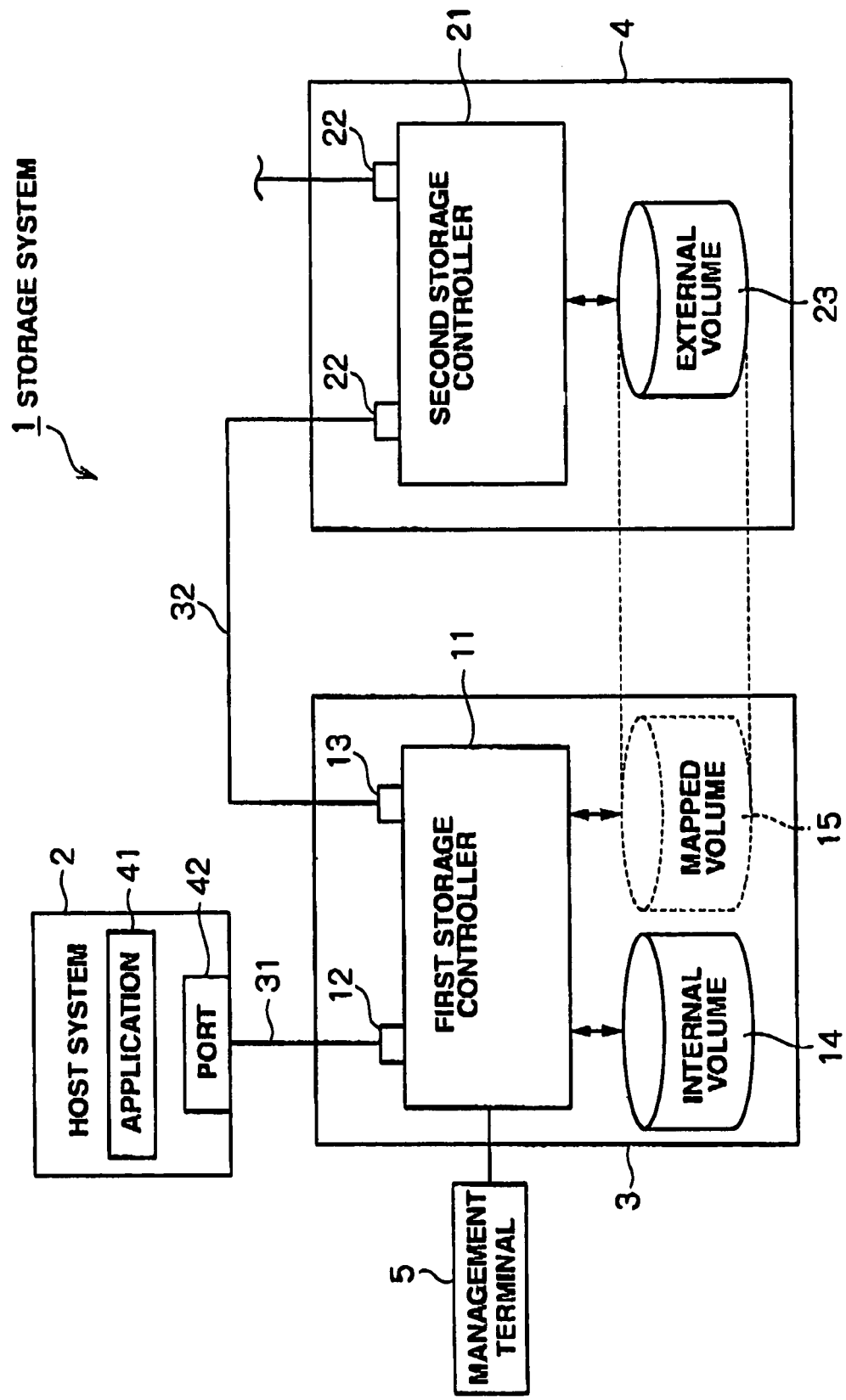
FIG. 1 is a schematic diagram of the storage system according to the first embodiment.

FIG. 1 shows the configuration of a storage system 1 according to the first embodiment. The storage system 1 has a host system 2, a first disk array device 3, a second disk array device 4, and a management terminal 5.

The first disk array device 3 has a first storage controller 11, a target port 12, an initiator port 13, an internal volume 14, and a mapped volume 15.

The second disk array device 4 has a second storage controller 21, a plurality of ports 22, and an external volume 23. The external volume 23 is an actual device formed on a physical storage device (a disk drive for example) provided inside the second disk array device 4. Since the external volume 23 exists outside when viewed from the first disk array device 3, this is referred to as an external volume as a matter of convenience. Nevertheless, from the perspective that the [external volume 23] exists inside the second disk array device 4, this is also an internal volume of the second disk array device 4.

The internal volume 14 of the first disk array device 3 is an actual device formed on a physical storage device (a disk drive for example) provided inside the first disk array device 3. The mapped volume 15 is a virtual existence that does not have an actual storage area, and the substance that stores data exists in the external volume 23 of the second disk array device 4. In other words, the mapped volume 15 is configured by the external volume 23 of the second disk array device 4 being mapped to the storage hierarchy of the first disk array device 3.

Here, mapping refers to the association (or assignment) of the devices. The devices to be associated may be actual devices or virtual devices. The first disk array device 3 incorporates the external volume 23 as its own internal volume, and provides this as an LU (Logical Unit) to the host system 2.

The target port 12 is connected to the host system 2 via a first communication network 31. The host system 2 is a business server system, workstation, mainframe, personal computer or the like. The host system 2 has an application program 41 constituted from the likes of a database using the storage resource provided by the first storage controller 3 or management software for managing the storage resource of the first storage controller 3, and a port 42 for communicating with the first disk array device 3.

As the first communication network 31, SAN (Storage Area Network), LAN (Local Area Network), Internet line, dedicated line, public line and so on may be used. When the host system 2 is to be connected to the first disk array device 3 via a SAN, the host system 2, according to a fibre channel protocol, requests the input and output of data in block units, which is a data management unit of the storage resource of the first disk array device 3.

Further, when the host system 2 is to be connected to the first disk array device 3 via a LAN, the host system 2, according to a NFS (Network File System) protocol or the like, designates a file name and requests the input and output of data in file units. In order to accept the file access request from the host system 2, the first disk array device 3 must be equipped with a NAS function.

Incidentally, when the first communication network 31 is a LAN, the port 42, for instance, is a LAN-compatible network card. When the communication network 31 is a SAN, the port 12, for example, is an HBA (Host Bus Adapter).

The initiator port 13 is an external port to be connected to the second disk array device 4 via the second communication network 32. The initiator port 13 is primarily used for transferring data between the mapped volume 15 and external volume 23.

Meanwhile, among the plurality of ports 22 of the second disk array device 4, a certain port is connected to the first disk array device 3 of the second communication network 32, and another port is connected to the likes of another host system or disk array device via a prescribed communication network.

The management terminal 5 is a terminal device for maintaining or managing the first disk array device 3. This management terminal 5, for instance, is able to set the logical device defined in the internal volume 14 or mapped volume 15, or change the RAID (Redundant Array of Independent Inexpensive Disks) configuration (for example, from RAID level 5 to RAID level 1). The communication of commands and the like in the management terminal 5 and the first disk array device 3 is prescribed in a SCSI (Small Computer System Interface) protocol. Incidentally, the first disk array device 3 and second disk array device 4 are both SCSI devices that operate based on the SCSI protocol.

Figure 2:
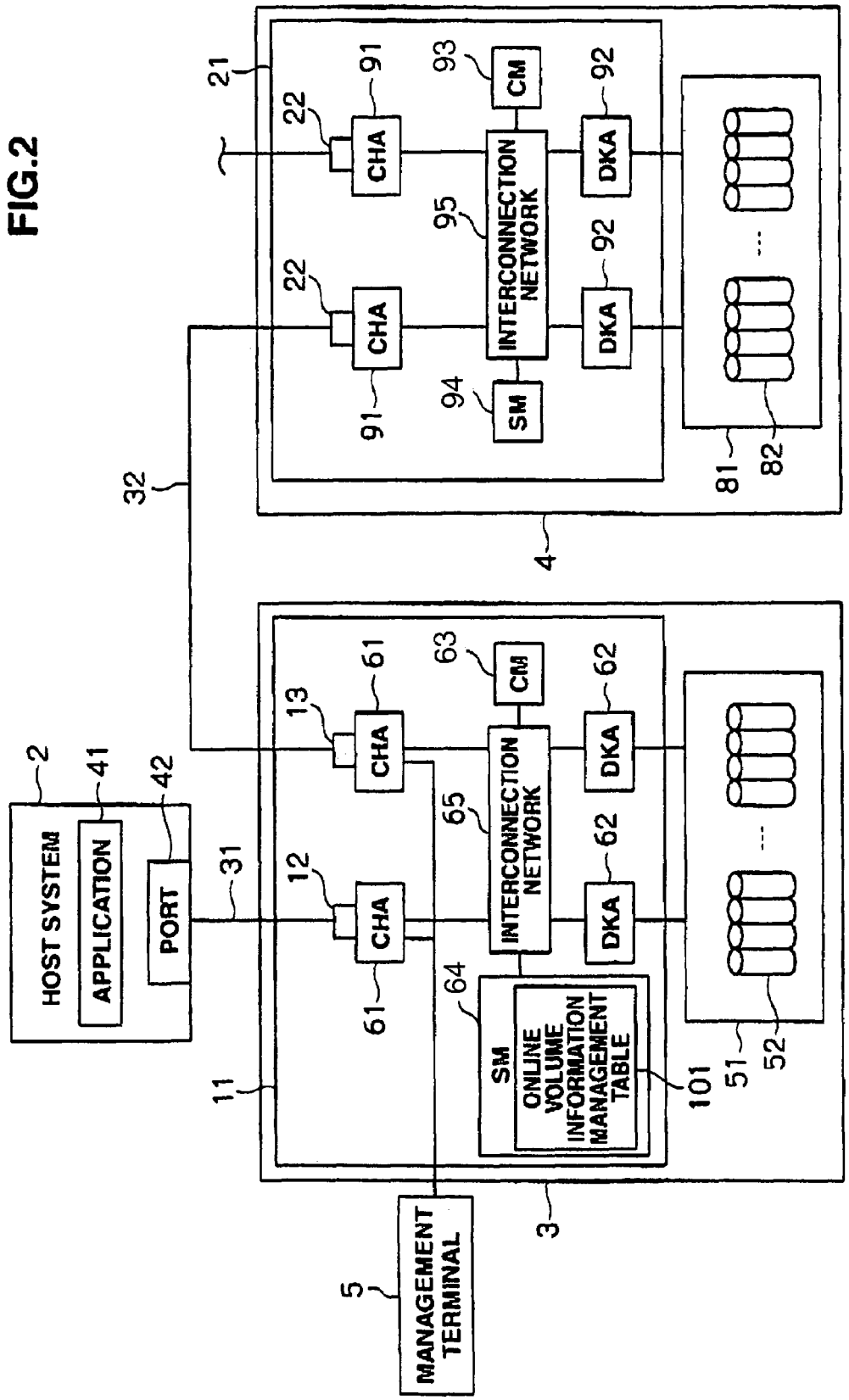
FIG. 2 is a schematic diagram showing the detailed configuration of the storage system.

FIG. 2 shows the detailed configuration of the storage system 1 in the first embodiment. Components having the same reference numerals as the components shown in FIG. 1 represent the same components, and the detailed explanation thereof is omitted. The first disk array device 3 has a first storage controller 11 and a first storage unit 51. The first storage controller 11 has a plurality of channel adapters (CHA) 61, a plurality of disk adapters (DKA) 62, a cache memory (CM) 63, a shared memory (SM) 64, and an interconnection network 65. The first storage unit 51 has a plurality of physical devices 52.

The respective channel adapters 61 are configured as a microcomputer system having a CPU and memory, and transmit and receive data to and from the host system 2. The channel adapter 61 has a target port 12 and an initiator port 13. The respective channel adapters 61 are assigned a unique network address (for example, an IP address or WWN), and are capable of independently functioning as a NAS. When there are a plurality of host systems 2, the respective channel adapters 61 independently receive and process the requests from the respective host systems 2.

The respective disk adapters 62 are configured as a microcomputer system having a CPU and memory, and control the reading and writing of data from and in the physical device 52.

The respective disk adapters 62, for instance, write data that the channel adapter 61 received from the host system 2, or data that the [channel adapter 61] read from the second disk array device 4 in a prescribed address of a prescribed physical device 52. Further, the respective disk adapters 62 transmit data read from a prescribed physical device 52 to the host system 2 or second disk array device 4.

Moreover, the respective disk adapters 62 convert a logical address into a physical address when reading and writing data from and in the physical device 52. When the physical device 52 is managed according to the RAID configuration, the respective disk adapters 62 access data according to such RAID configuration. For example, the respective disk adapters 62 respectively write the same data in a separate physical device group (RAID group), or execute parity processing and write data and parity data in the physical device group.

The cache memory 63 is a storage resource for temporarily storing data received from the host system 2 or second disk array device 4, or temporarily storing data read from the physical device 52.

The shared memory 64 is a storage resource storing an online volume information management table 101 that stores commands received from the host system 2, and numerous types of online volume information 102 of the external volume 23 mapped to the mapped volume 15 described later.

Incidentally, one or more physical devices 52 may be used as a cache disk. Further, the cache memory 63 and shared memory 64 may be configured to be separated memories, or a partial storage area of the same memory may be used as the cache area, and another storage area may be used as the control area.

The interconnection network 65 mutually connects the respective channel adapters 61, respective disk adapters 62, cache memory 63 and shared memory 64. The interconnection network 65, for instance, is a high-speed bus such as an ultrafast crossbar switch that performs data transfer by high-speed switching.

The physical device 52, for example, is a storage device having an actual storage area such as a hard disk drive, flexible disk drive, magnetic tape drive, semiconductor memory drive, optical disk drive or the like. Further, for instance, different types of disks such as an FC (Fibre Channel) disk and SATA (Serial AT Attachment) disk may coexist in the first storage unit 51.

Figure 3:
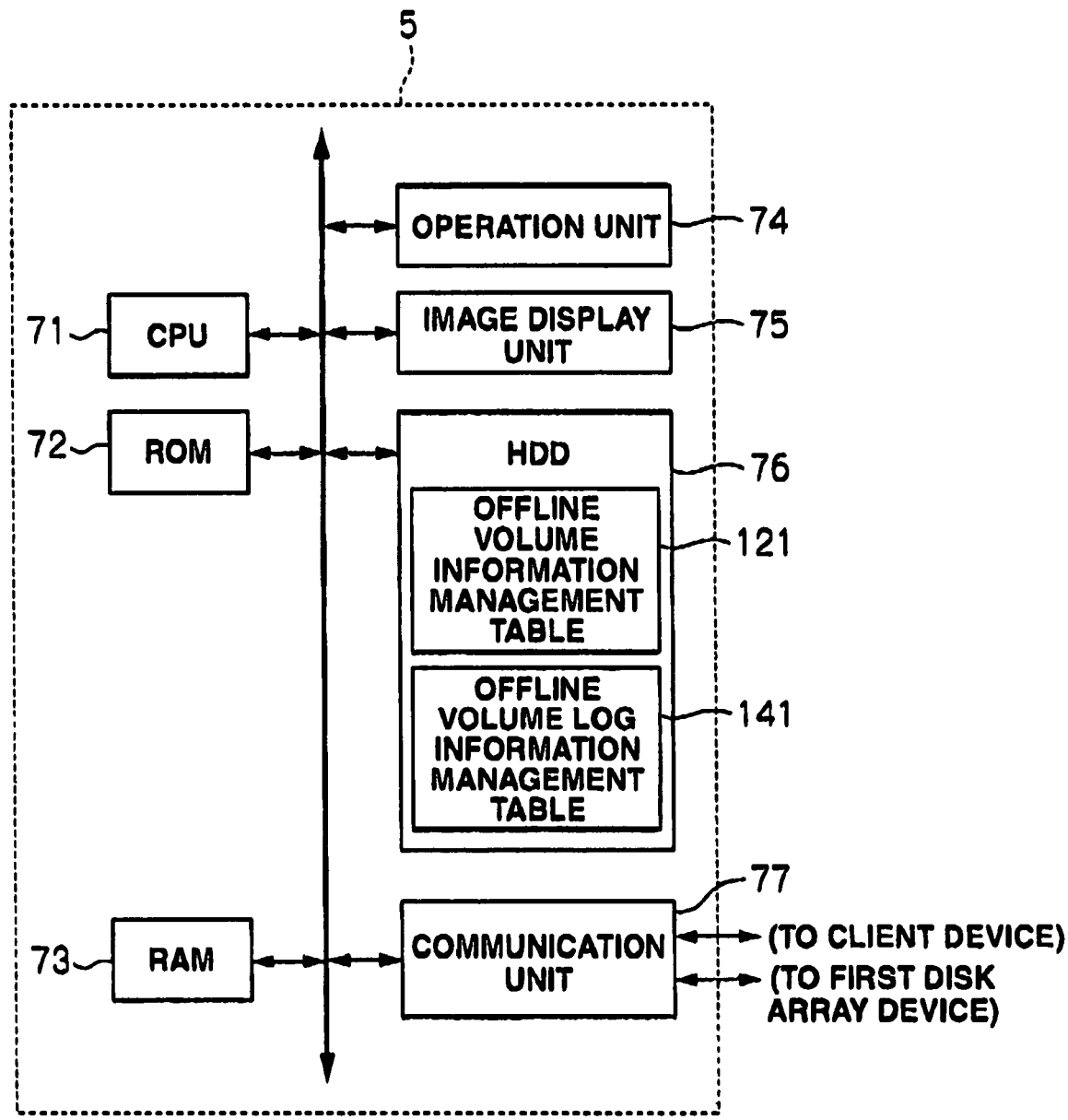
FIG. 3 is a schematic diagram showing the configuration of a management terminal.

The management terminal 5, for example, is configured as shown in FIG. 3. As evident from FIG. 3, the management terminal 5 is configured by a CPU 71, a ROM (Read Only Memory) 72 storing various control programs, a RAM (Random Access Memory) 73 as a work memory of the CPU 71, an operating unit 74 for accepting the user's operation, an image display unit 75 including a display for displaying necessary information or GUI according to the user's operation, a hard disk 76 storing various types of application software, and a communication unit 77 for functioning as an interface upon communicating with the channel adapter 61 or disk adapter 62 or a client device (not shown) of the management terminal being mutually connected via a bus 78.

Here, the hard disk drive 76 stores an offline volume information management table 121 that stores control programs (not shown) for controlling the overall management terminal 5 and first disk array device 4 and a plurality of types of offline volume information 122 described later, and an offline volume log information management table 141 that stores a plurality of types of offline volume log information 142 also described later. And, the CPU 71 reads these control programs from the hard disk drive 76 and expands these in the RAM 73, and executes various types of processing according to these control programs.

The second disk array device 4 has a second storage controller 21 and a second storage unit 81. The detailed configuration of the second storage controller 21 and second storage unit 81 is the same as the detailed configuration of the foregoing first storage controller 11 and first storage unit 51. The second storage controller 21 has a plurality of channel adapters 91, a plurality of disk adapters 92, a cache memory 93, a shared memory 94, and an interconnection network 95. The second storage unit 81 has a plurality of physical devices 82.

Figure 4:
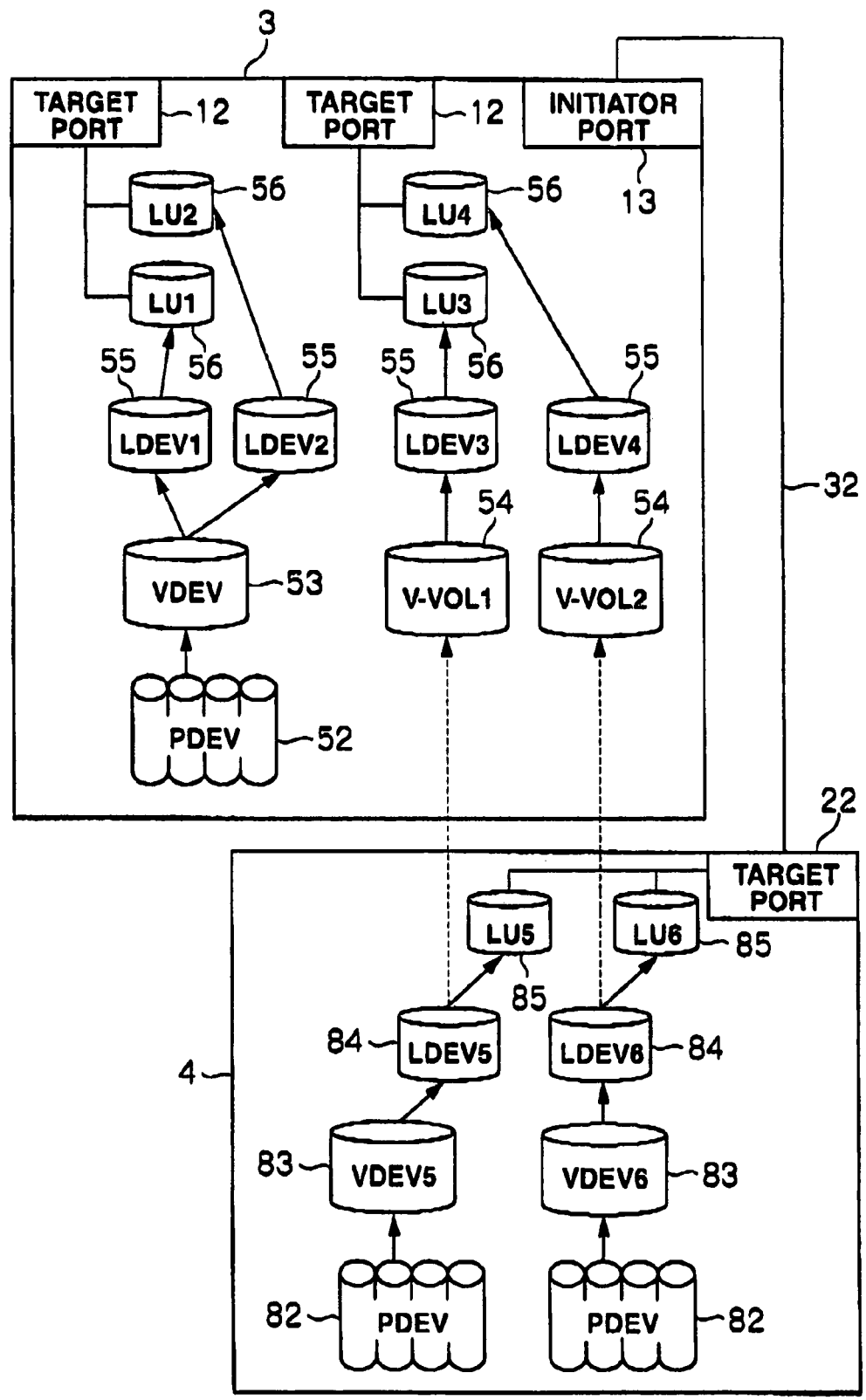
FIG. 4 is a conceptual diagram for explaining the storage hierarchy of the storage system.

FIG. 4 shows the storage hierarchy configured in the first disk array device 3 and second disk array device 4. The storage hierarchy in the first disk array device 3 can be broadly classified into a physical storage hierarchy and a logical storage hierarchy. The physical storage hierarchy is configured with the physical device 52.

The logical storage hierarchy can be configured from a plurality of (for example two types of) hierarchies. One logical hierarchy is configured from a VDEV (Virtual Device) 53 and a virtual VDEV (hereinafter referred to as a "V-VOL") 54 that is treated like the VDEV 53. Another logical hierarchy is configured from an LDEV (Logical Device) 55.

The VDEV 53, for example, is configured by grouping a prescribed number of physical devices 52, such as in a set of fours (3D+1P), or a set of eights (7D+1P). In other words, the storage areas provided respectively from the plurality of physical devices 52 belonging to the group are assembled to form a single RAID storage area, and this RAID storage area becomes the VDEV 53.

In contrast to the VDEV 53 being created on the physical device 52, the V-VOL 54 is a virtual intermediate storage device that does not require a physical storage area. The V-VOL 54 is not directly associated with a physical storage area, and is a virtual existence to become the receiver for mapping an LU (Logical Unit) of the second disk array device 4.

At least one or more LDEVs 55 may be provided on the VDEV 53 or V-VOL 54. The LDEV 55, for instance, may be configured by dividing the VDEV 53 in a fixed length. When the host system 2 is an open host system, by the LDEV 55 being mapped with the LU 56, the host system 2 will recognize the LDEV 55 as a single physical device. An open host system 2 can access a desired LDEV 55 by designating the LUN (Logical Unit Number) or logical block address. Incidentally, a mainframe host will directly recognize the LDEV 55.

The LU 56 is a device that can be recognized by the host system 2 as a logical unit of SCSI. Each LU 56 is connected to the host system 2 via the target port 12. At least one or more LDEVs 55 may be respectively mapped to each LU 56. As a result of mapping a plurality of LDEVs 55 to a single LU 56, the LU size can be virtually expanded.

The second disk array device 4 has a plurality of physical devices 82, a VDEV 83 set on the storage area provided by the physical devices 82, and at least one or more LDEVs 84 capable of being set on the VDEV 83. The LDEV 84 is mapped to the LU 85. The LU 85 (i.e., LDEV 84) is mapped to the V-VOL 54, which is a virtual intermediate storage device, and may also be used from the first disk array device 3.

For example, the "LDEV 5", "LDEV 6" of the second disk array device 4 are respectively mapped to the "V-VOL 1", "V-VOL 2" of the first disk array device 3 via the "LU 5", "LU 6" of the second disk array device 4. And, "V-VOL 1", "V-VOL 2" are respectively mapped to the 'LDEV 3", "LDEV 4", and respectively provided to the host system 2 as the "LU 3", "LU 4".

Incidentally, the VDEV 53, V-VOL 54 may adopt the RAID configuration. In other words, a single physical device 52 may be assigned to a plurality of VDEVs 53, V-VOLs 54 (slicing), and a single VDEV 53, V-VOL 54 may be formed from a plurality of physical devices 52 (striping).

The "LDEV 1" or "LDEV 2" of the first disk array device 3 corresponds to the internal volume 14 depicted in FIG. 1. The "LDEV 3" or "LDEV 4" of the first disk array device 3 corresponds to mapped volume 15 depicted in FIG. 1. The "LDEV 5" or "LDEV 6" of the second disk array device 4 corresponds to the external volume 23 depicted in FIG. 1.

(1-2). Offline Volumization Processing and Online Volumization Processing According to First Embodiment Next, the offline volume processing and online volume processing according to the present embodiment are explained. As one characteristic of the storage system 1 of this embodiment, based on an external operation, offline volume information 122 based on online volume information 102 managed in an online volume information management table 101 is transmitted to the management terminal 5, and managed in an offline volume information management table 121 of the management terminal 5.

Figure 5:
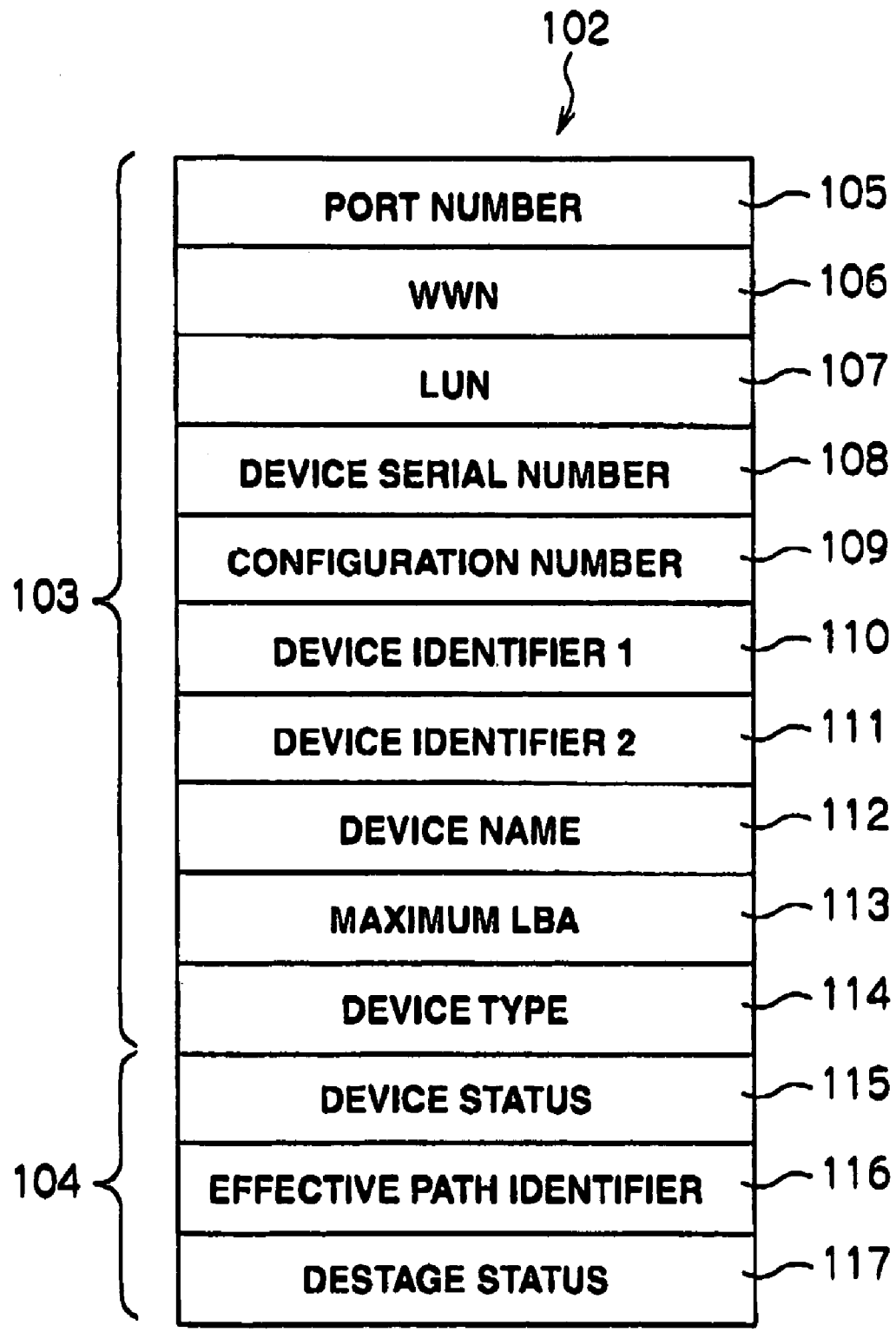
FIG. 5 is a conceptual diagram for explaining online volume information.

Here, FIG. 5 shows the online volume information 102 managed with the online volume information management table 101. Here, the online volume information 102 represents the volume information of the external volume 23 mapped as the mapped volume 15 managed with the online volume information management table 101. Further, the online volume information management table 101 manages a plurality of types of online volume information 102.

This online volume information 102 is broadly classified into online volume positional information 103 relating to the second disk array device 4 having an external volume 23, and online volume connection status information 104 relating to the connection status of the first disk array device 3 and external volume 23.

The online volume positional information 103 is configured from port number information 105 representing the port number of an initiator port 13, WWN information 106 representing a target port 22, LUN information 107 representing a LUN of an external volume 23, device serial number information 108 representing a device serial number of the second disk array device 4, configuration number information 109 representing a number in the configuration file storing the number of a connectable device, device identifier 1 information 110 and device identifier 2 information 111 representing an identifier for identifying a logical device of the external volume 23, device name information 112 representing the name of the second disk array device 4, maximum LBA (Logical Brock Address) information 113 representing the capacity of the external volume 23, and device type information 114 representing the type of physical device 82.

Figure 6:
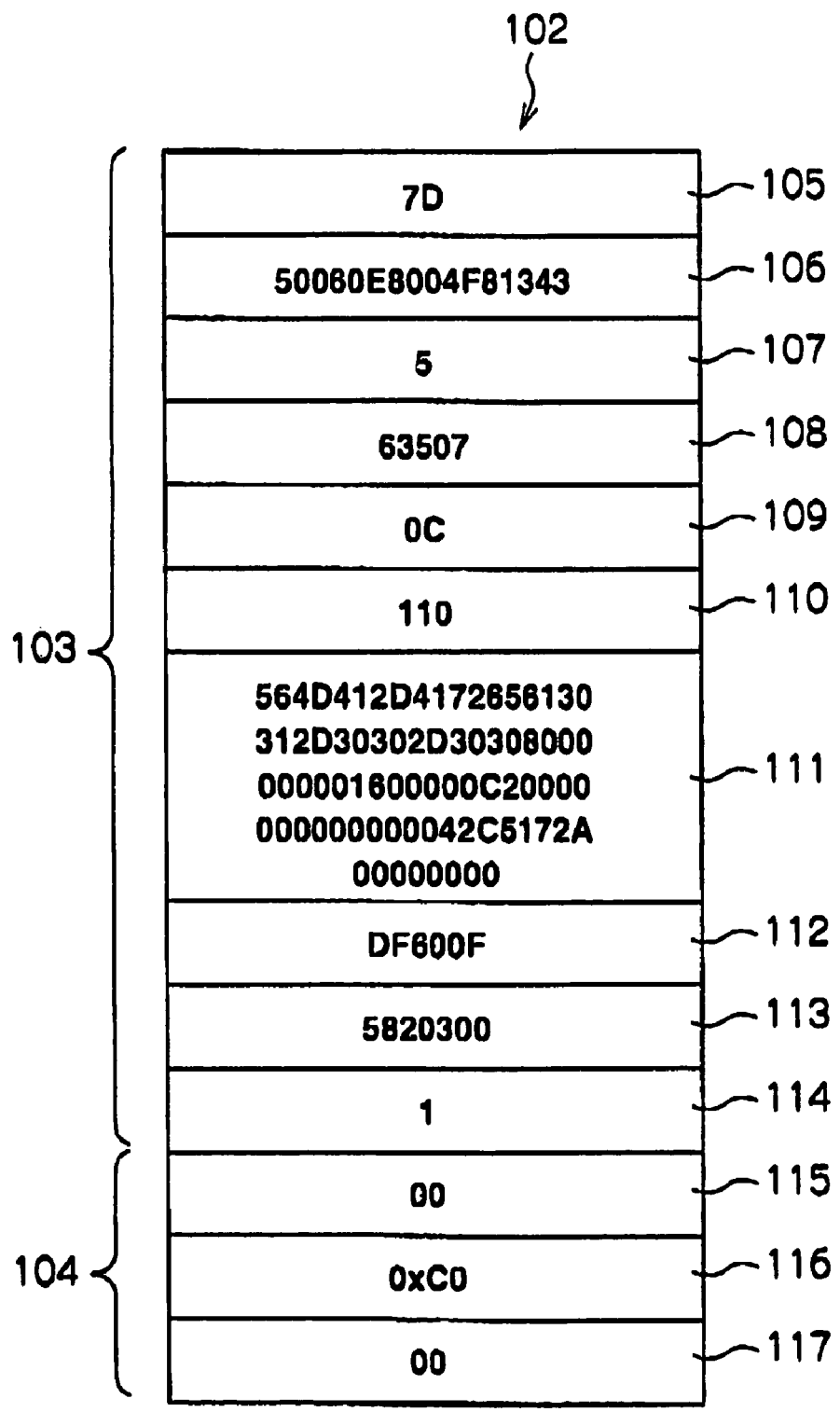
FIG. 6 is a conceptual diagram for explaining a configuration example of the online volume information.
Figure 7:
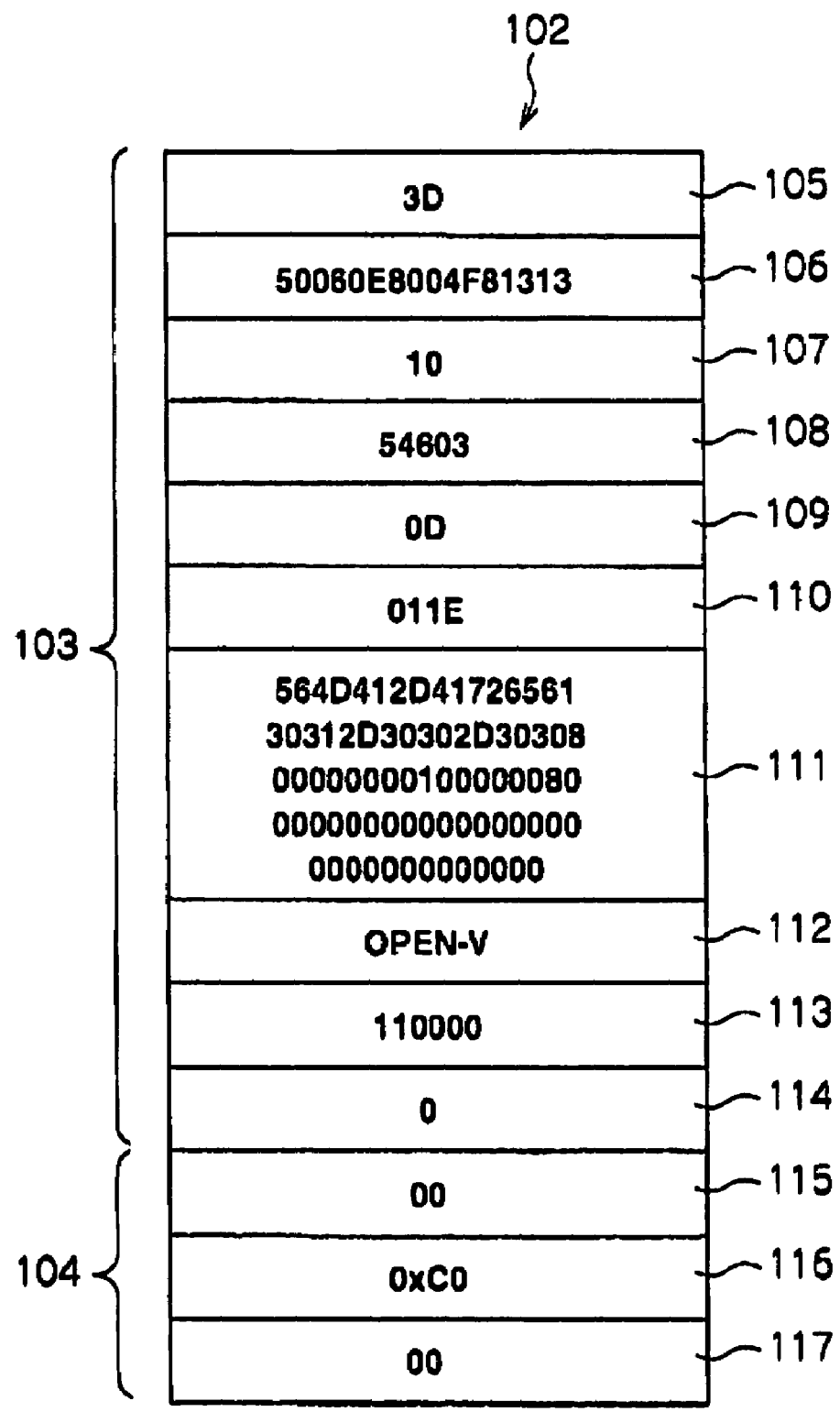
FIG. 7 is a conceptual diagram for explaining a configuration example of the online volume information.

The online volume connection status information 104 is configured from device status information 115 representing the connection status of the first disk array device 3 and the external volume 23 (logical device), effective path identifier information 116 representing a path connected to the first disk array device 3, and destage status information 117 representing the amount of data migrated from the cache memory 63 to the external volume 23 corresponding to the online volume information 102. For example, the online volume information 102 is configured as depicted in FIG. 6 and FIG. 7.

Here, the storage system 1 secures the capacity based on the external volume 23 of the online volume information 102 in the cache memory 63 and shared memory 64 for each type of online volume information 102 managed with the online volume information management table 101.

Figure 8:
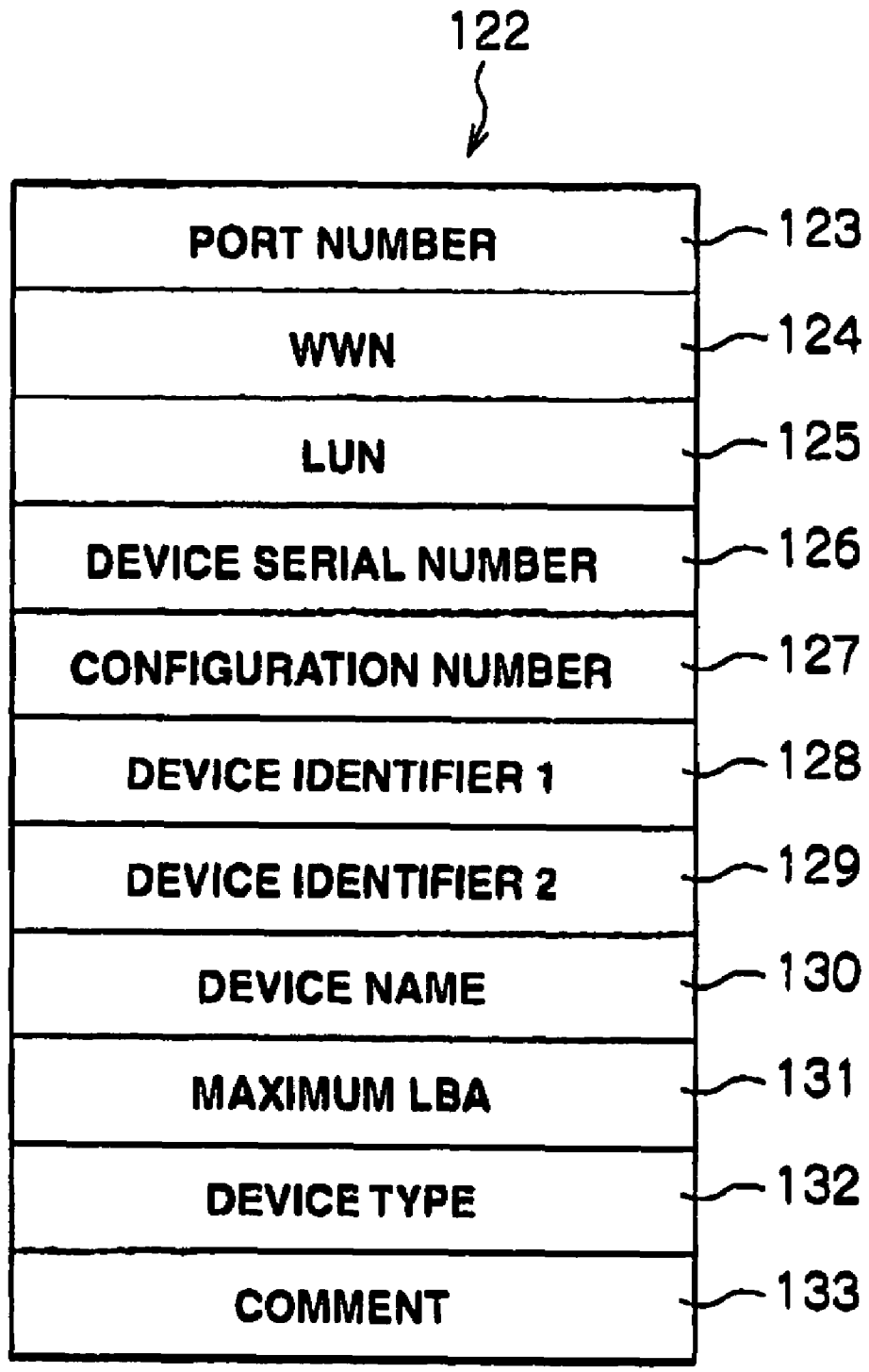
FIG. 8 is a conceptual diagram for explaining offline volume information.

Meanwhile, FIG. 8 shows offline volume information 122 managed with an offline volume information management table 121. Here, offline volume information 122 represents the volume information of the external volume 23 that is not mapped as the mapped volume 15 managed with the offline volume information management table 121 but not managed with the online volume information management table 101.

Further, the offline volume information management table 121 manages a plurality of types of offline volume information 122.

Figure 9:
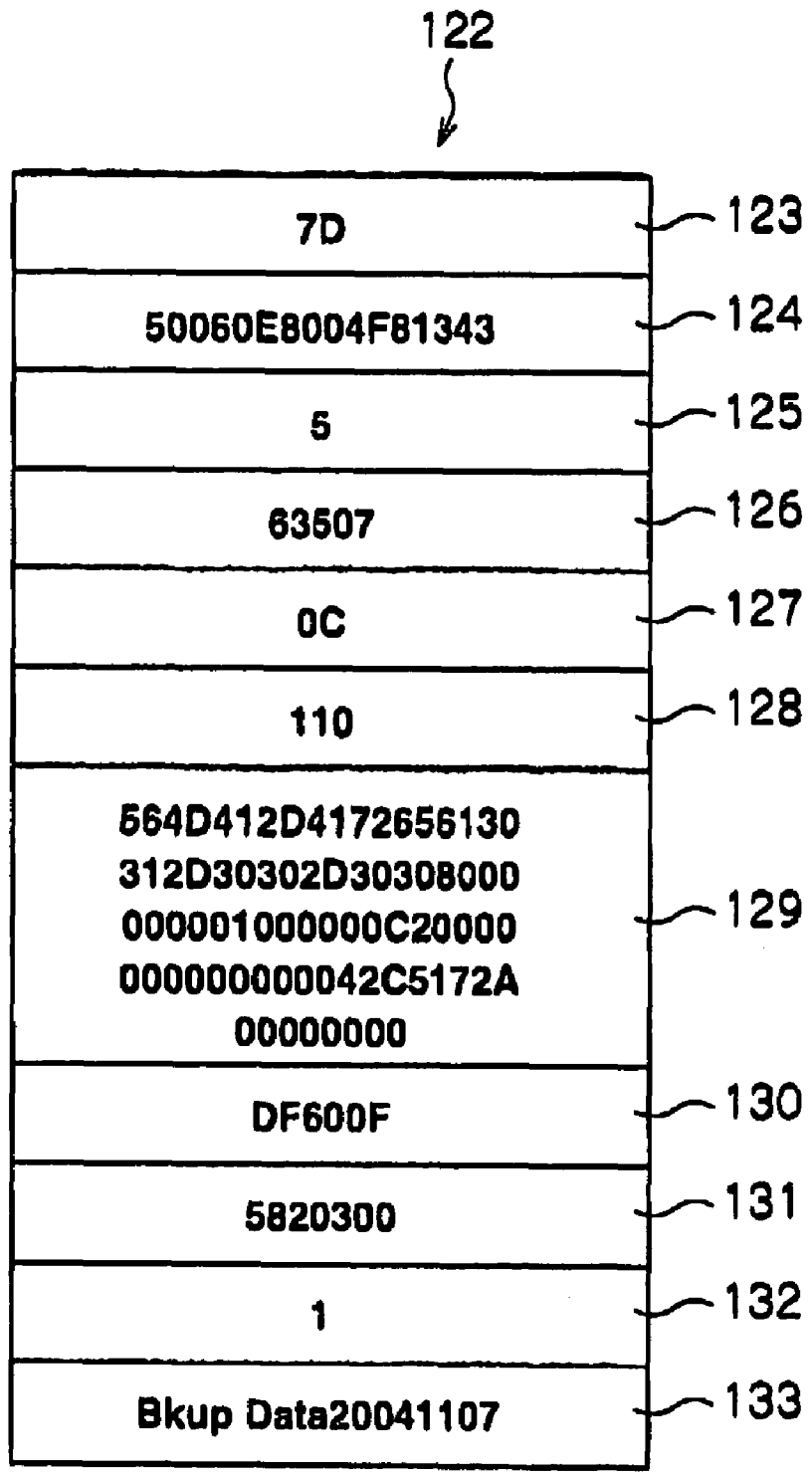
FIG. 9 is a conceptual diagram for explaining a configuration example of the offline volume information.

Since the online volume positional information 103 of the foregoing online volume information 102 is extracted and managed with the offline volume information management table 121, this offline volume information 122, as with the online volume positional information 103 described above, is configured from port number information 123, WWN information 124, LUN information 125, device serial number information 126, configuration number information 127, device identifier 1 information 128, device identifier 2 information 129, device name information 130, maximum LBA information 131, device type information 132, and comment information 133 representing a comment input based on the user's operation. For example, the offline volume information 122 is configured as depicted in FIG. 9.

Here, the storage system 1 does not secure the capacity based on the external volume 23 in the cache memory 63 and shared memory 64 with respect to the external volume 23 managed with the offline volume information management table 121.

Figure 10:
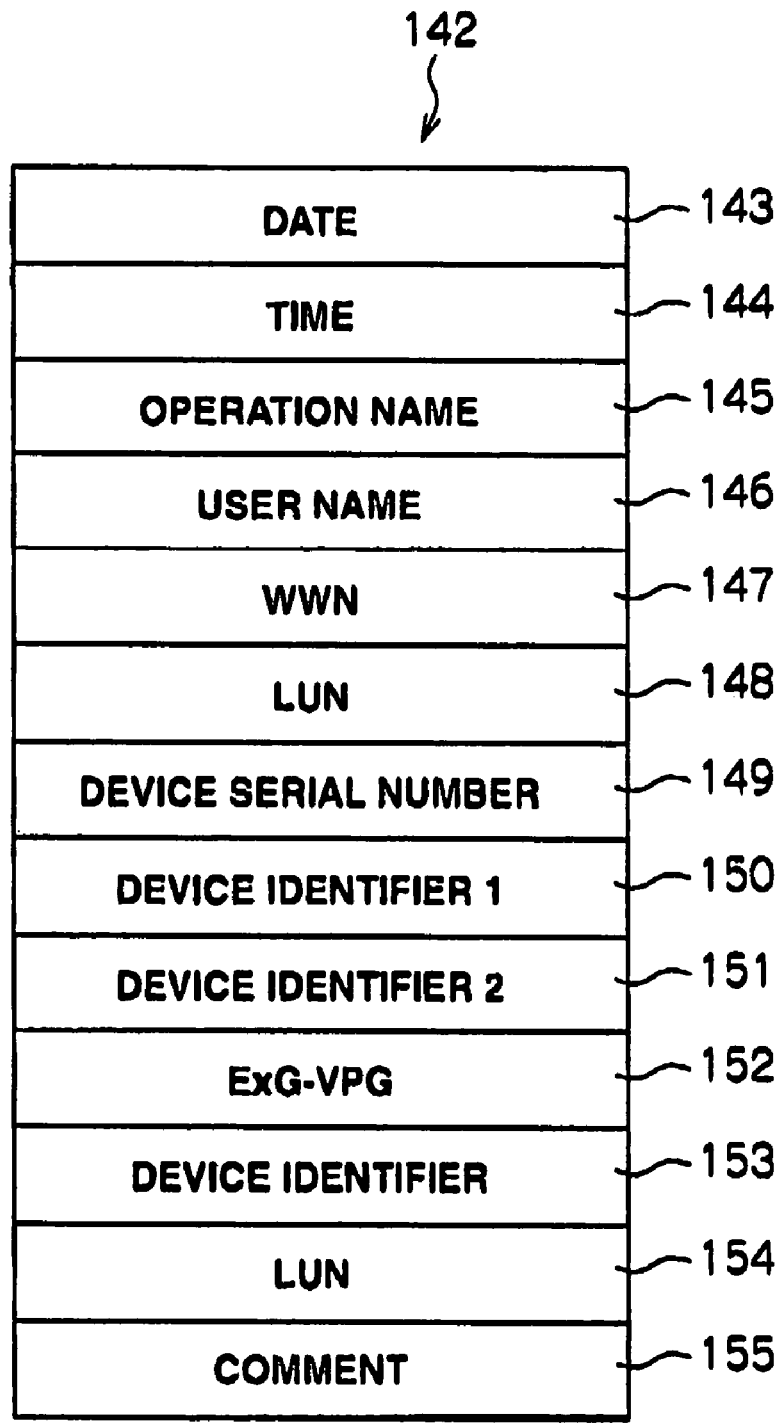
FIG. 10 is a conceptual diagram for explaining offline volume log information.

Meanwhile, FIG. 10 shows offline volume log information 142 managed with an offline volume log information management table 141. Here, the offline volume log information 142 represents information showing the operation log of the management of the offline volume information management table 121. Further, the offline volume log information management table 141 manages a plurality of types of offline volume log information 142.

Figure 11:
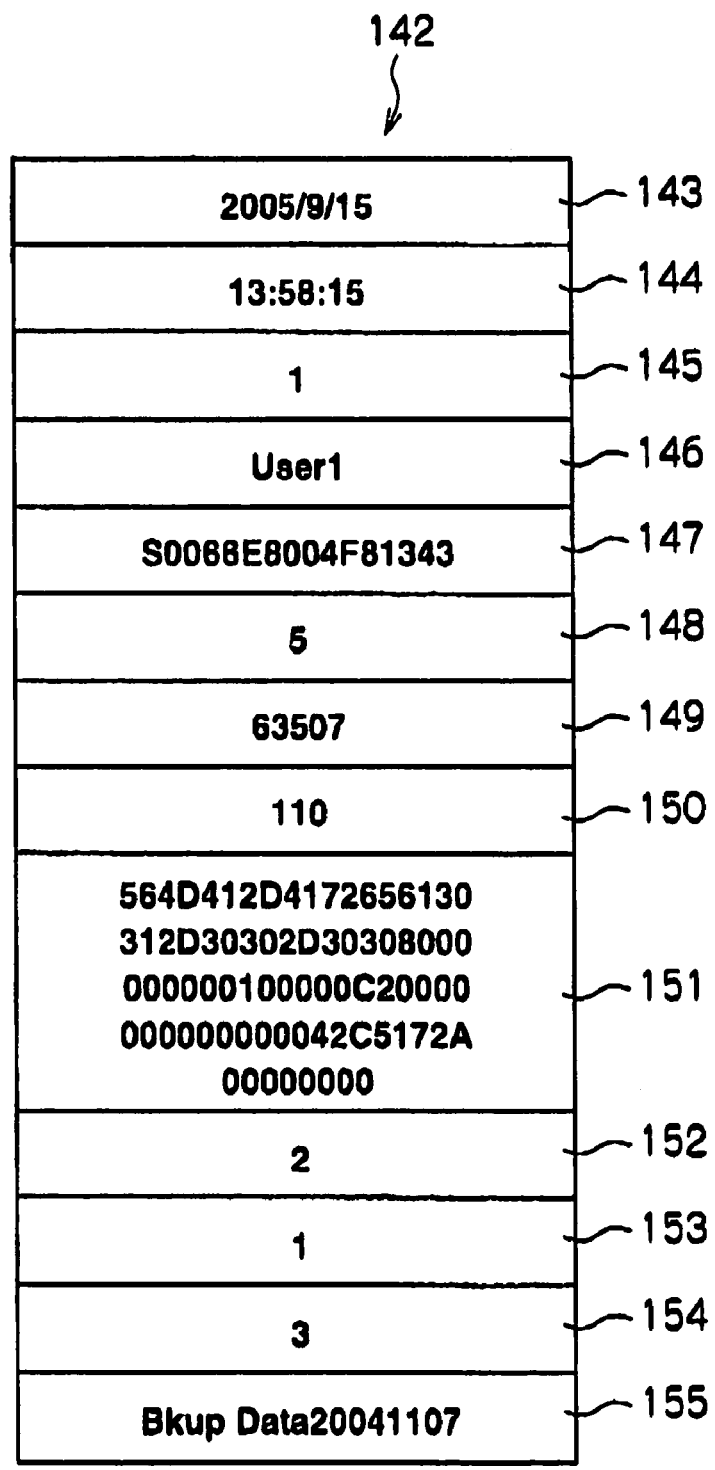
FIG. 11 is a conceptual diagram for explaining a configuration example of the offline volume log information.

This offline volume log information 142 is configured from date information 143 representing the log date of the offline volume information 122, time information 144 showing the log time, operation name information 145 representing the operation used to log onto the offline volume information 122, user name information 146 representing the name of the user who logged onto the offline volume information 122, WWN information 147, LUN information 148, device serial number information 149, device identifier 1 information 150 and device identifier 2 information 1 51 as with the foregoing online volume positional information 103, ExG-VPG information 152 representing ExG-VPG when the external volume 23 is mapped as the mapped volume 15, device identifier information 153 representing an identifier for identifying the logical device of the external volume 23 when it was mapped, LUN information 154 representing the LUN when it was mapped, and comment information 155 representing a comment input based on the user's operation. For example, the offline volume log information 142 is configured as depicted in FIG. 11.

Figure 12:
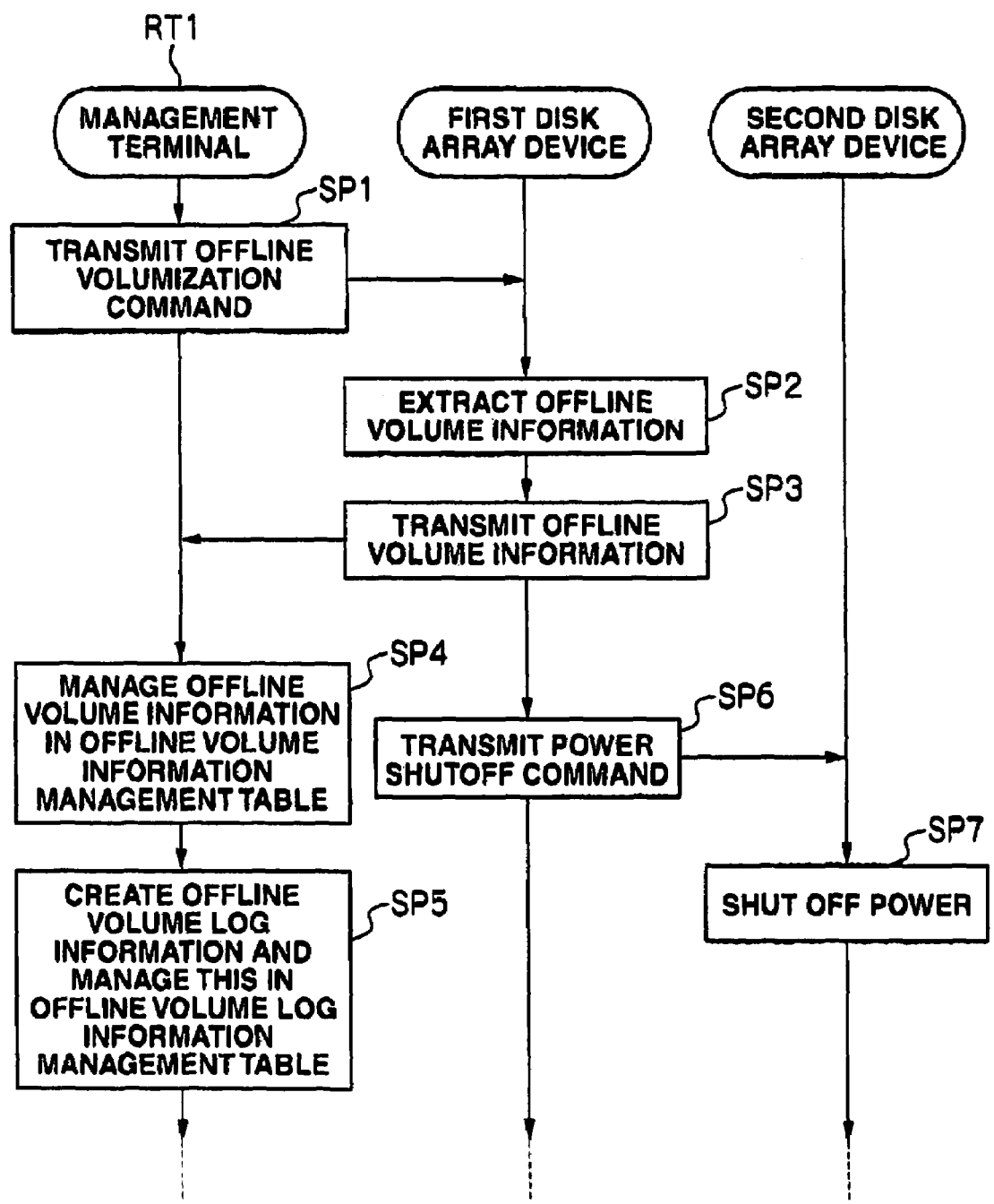
FIG. 12 is a flowchart for explaining the offline volumization processing routine.

Here, FIG. 12 is a flowchart showing the specific processing routine of the offline volumization processing for performing offline volumization to the external volume 23 mapped as the mapped volume 15. Here, offline volumization means to manage the online volume positional information of the online volume information managed in the online volume information management table 101 as the offline volume information 122 in the offline volume information management table 121.

The CPU 71 of the management terminal 5, initially, when the external volume 23 to be subject to offline volumization is selected based on the operation of the operation unit 74 of the management 5 or an operating unit of a client device (not shown) according to the offline volumization processing routine RT1 shown in FIG. 12, or the external volume 23 to be subject to offline volumization is automatically selected, creates an offline volumization order of the selected external volume 23, and transmits this offline volumization order to the disk adapter 62 of the first disk array device 3 (SP1).

The disk adapter 62 of the first disk array device 3, based on the received offline volumization order, extracts the online volume positional information 103 of the online volume information 102 of the selected external volume 23 as the offline volume information 122 (SP2).

Next, the disk adapter 62 of the first disk array device 3 transmits the offline volume information 122 to the HDD 76 of the management terminal 5 (SP3). Incidentally, the disk adapter 62 of the first disk array device 3, after transmitting the offline volume information 122 to the HDD 76 of the management terminal 5, deletes the online volume information 102 of the selected external volume 23 from the online volume information management table 101.

The CPU 71 of the management terminal 5, based on the received offline volume information 122, updates the offline volume information management table 121, and manages the offline volume information 122 in the offline volume information management table 121 (SP4). Incidentally, the CPU 71 of the management terminal 5 is able to write comments in the comment information 133 of the offline volume information 122 based on the operation of the operating unit 74 of the management terminal 5, or an operating unit of a client device (not shown).

Like this, with the storage system 1, when the first disk array device 3 receives an offline volumization order, by extracting the online volume positional information 103 of the online volume information 102 managed in the online volume information management table 101 as the offline volume information 122, transmitting this offline volume information 122 to the management terminal 5, and managing this in the offline volume information management table 121 of the management terminal 5, the capacity that was secured in the cache memory 63 and shared memory 64 by the external volume 23 of the online volume information 102 will be released, the secured area in the cache memory 63 and shared memory 64 can be reduced, and the reading and writing of data can be sped up thereby.

Next, the CPU 71 of the management terminal 5 creates the offline volume log information 142 based on the operating user, such user's operation and offline volume information 122, and manages this offline volume log information 142 in the offline volume log information management table 141 (SP5).

Like this, with the storage system 1, each time the offline volume information 122 is managed in the offline volume information management table 121, by creating the offline volume log information 142 and managing such offline volume log information 142 in the offline volume log information management table 141, the offline volume log information management table 141 can be displayed on an image display unit 75 upon referring to the log of the offline volume information 122 so to allow the user to instantaneously recognize the log of the offline volume information 122. Thereby, it is possible to provide a storage system 1 that is even more user-friendly to the user.

Further, the disk adapter 62 of the first disk array device 3 transmits the offline volume information 122 of the selected external volume 23 to the HDD 76 of the management terminal 5, creates a power shutoff order to shut off the power of the external volume 23, and transmits this power shutoff order to the disk adapter 92 of the second disk array device 4 (SP6).

The disk adapter 92 of the second disk array device 4, based on the received power shutoff order, shuts off the power of the physical device 82 of the selected external volume 23 (SP7).

Like this, with the storage system 1, by shutting off the power of the external volume 23 selected based on the operation of the operating unit 74 of the management terminal 5 or an operating unit of a client device (not shown), the power of the external volume 23 without any I/O command of data from the host system 2 can be shut off automatically. Thereby, it is possible to provide a storage system 1 which, in addition to preventing the waste of storage areas, is capable of preventing the waste of electrical power.

Figure 13:
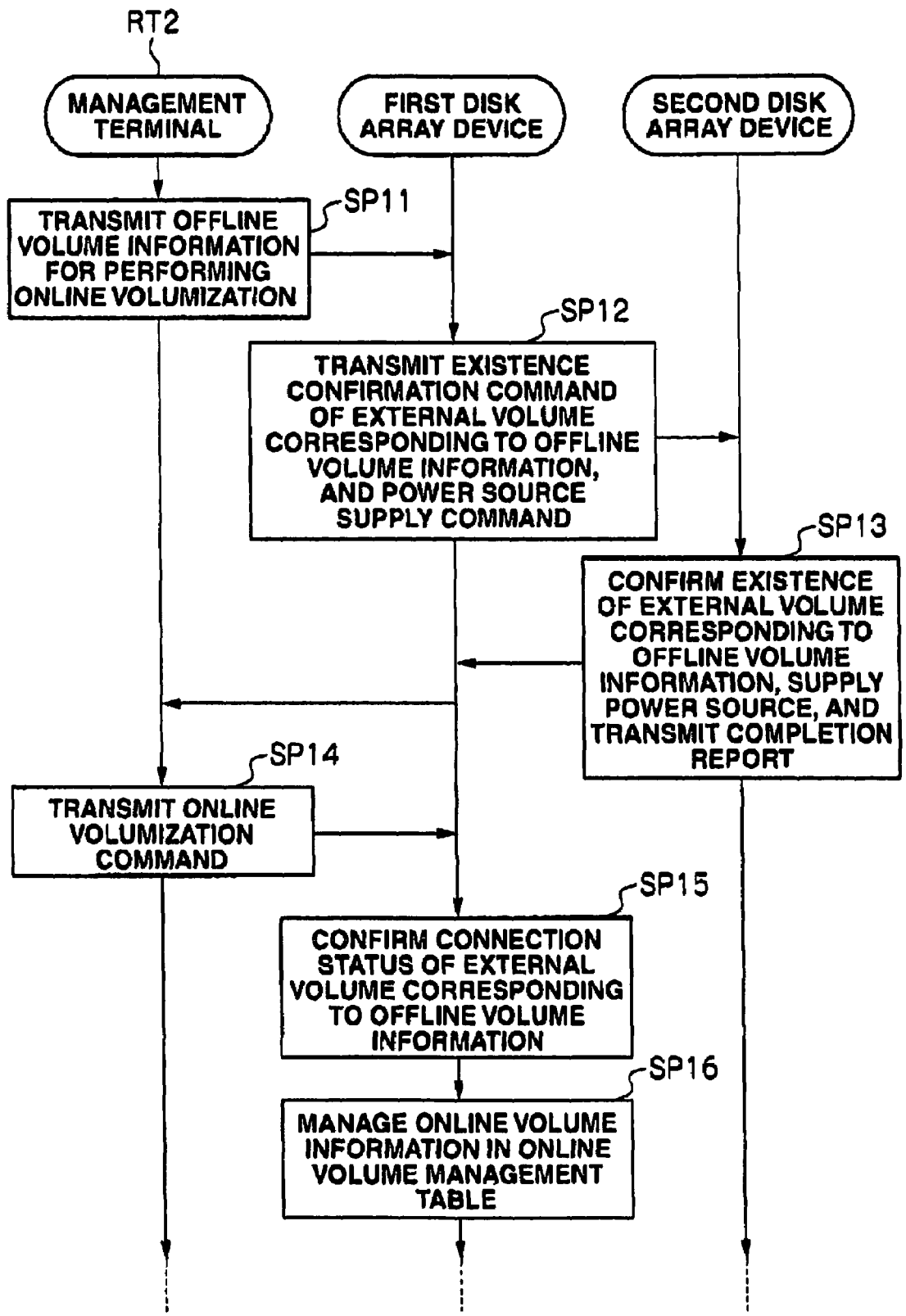
FIG. 13 is a flowchart for explaining the online volumization processing routine.

Meanwhile, FIG. 13 is a flowchart showing the specific processing routine of the online volumization processing for performing online volumization to the external volume 23 corresponding to the offline volume information 122 managed in the offline volume information management table 121. Here, online volumization means to manage, in the online volume information management table 101, the online volume information 102 based on the offline volume information 122 managed in the offline volume information management table 121.

The CPU 71 of the management terminal 5, initially, when the offline volume information 122 of the external volume 23 to be subject to online volumization is selected based on the operation of the operation unit 74 of the management 5 or an operating unit of a client device (not shown) according to the online volumization processing routine RT2 shown in FIG. 13, transmits the offline volumization information 122 of the selected external 23 to the disk adapter 62 of the first disk array device 3 (SP11).

The disk adapter 62 of the first disk array device 3 transmits to the disk adapter 82 of the second disk array device 4 an existence confirmation order for confirming whether the external volume 23 corresponding to the received offline volume information 122 exists existing during the its offline volumization, and transmits a power supply order for supplying power to the external volume 23 when the existence of the external volume 23 is confirmed (SP12).

Like this, with the storage system 1, when the external volume 23 to be subject to offline volumization is selected, by power being supplied to the external volume 23 that was shut off due to offline volumization, the supply of power to the external volume 23 to be subject to offline volumization can be started automatically. Thereby, without having to force the user to perform complicated operations, it will be possible to provide an even more user-friendly storage system 1.

The disk adapter 92 of the second disk array device 4, based on the received existence confirmation order, confirms whether the external volume 23 corresponding to the offline volume information 122 exists, and, when it does exist, based on the received power supply order, supplies power to the physical device 82 of the external volume 23 and transmits a completion report to the management terminal 5 of the CPU 71 via the first disk array device 3 for reporting the completion of the existence confirmation order and power supply order (SP13).

When the CPU 71 of the management terminal 5 receives a completion report from the disk adapter 92 of the second disk array device 4, it creates an online volumization order of the offline volume information 122 of the external volume 23 to which power was supplied by the disk adapter 92, and transmits this online volumization order to the disk adapter 62 of the first disk array device 3 (SP14).

Like this, with the storage system 1, by transmitting an existence confirmation order for confirming whether the external volume 23 corresponding to the received offline volume information 122 exists during its offline volumization in the first disk array device 3, and transmitting the online volumization order to the first disk array device 3 after receiving the completion report from the disk adapter 92 of the second disk array device 4 in the management terminal 5, it will be possible to perform online volumization processing after confirming that the external volume 23 selected to be subject to offline volumization based on the operation of the operating unit 74 of the management terminal 5 or an operating unit of a client device (not shown) actually exists in the second disk array device 4. Thus, discovering that the corresponding external volume 23 did not exist after performing online volumization processing can be effectively prevented from occurring. Thereby, without having to force the user to perform complicated operations, it will be possible to provide an even more user-friendly storage system 1.

The disk adapter 62 of the first disk array device 3, based on the received online volumization order, confirms the connection status of the external volume 23 to which power was supplied, and the first disk array device 3 (SP15).

Specifically, the disk adapter 62 of the first disk array device 3 confirms the various connection statuses relating to the foregoing online volume connection status information 104; namely, the connection status of the external volume 23 and the first disk array device 3, path connecting the external volume 23 and the first disk array device 3, and the amount of data migrated from the cache memory 63 to the external volume 23.

Here, for instance, as shown in FIG. 7, when the device status information 115 is "00", this shows that the connection status is "normal", and when it is "01", this shows that the connection status is "blocked". Further, for instance, as shown in FIG. 7, when the effective path identifier information 116 is "0xCO", this shows that the effective path is the "third path from the left", and when it is "0xBO", this shows that the effective path is the "second path from the left". Moreover, for instance, as shown in FIG. 7, when the destage status information 117 is "00", this shows that the migration of data from the cache memory 63 to the external volume 23 is "0%", and when it is "64", this shows that the migration of data is "100%".

Incidentally, after the CPU 71 of the management terminal 5 transmits the offline volumization order to the first disk array device 3, it deletes the online volume information 122 of the selected external volume 23 from the offline volume information management table 121.

And, the disk adapter 62 of the first disk array device 3 adds the volume connection status information 104, which is connection status information, and information excluding the comment information 115 of the offline volume information 122 transmitted from the management terminal 5, which is positional information of the external volume 23 to be subject to online volumization, as the online volume positional information 103, to the online volume information management table 101 as the online volume information 102, and manages this online volume information 102 in the online volume information management table 101 (SP16).

Like this, with the storage system 1, by performing offline volumization based on the operation of the operating unit 74 of the management terminal 5 or an operating unit of a client device (not shown), or performing such offline volumization automatically, and performing online volumization based on the operation of the operating unit 74 of the management terminal 5 or an operating unit of a client device (not shown), offline volumization and online volumization can be instantaneously switched. Thereby, it will be possible to provide an even more user-friendly storage system 1.

Incidentally, the CPU 71 of the management terminal 5 by creating the offline volume information 122 based on the operation of the operating unit 74 of the management terminal 5 or an operating unit of a client device (not shown), will be able to create in advance the offline volume information 122 of the external volume 23 of the second disk array device 4 that is not currently connected to the first disk array device 3, and perform online volumization when the second disk array device 4 is connected or in other necessary cases, Thereby, it will be possible to provide a storage system 1 having a higher degree of freedom in the network storage configuration.

Further still, in the present embodiment, although a case was explained where power shutoff processing is performed during offline volumization processing, and power supply processing is performed during online volumization processing, the present invention is not limited thereto, and the power shutoff processing does not necessarily have to be performed. In such a case, it will not be necessary to perform the power supply processing.

Next, the specific operation example of the storage system 1 in the present embodiment is explained. With recent storage systems, the concept of data lifecycle management is being suggested. This data lifecycle management efficiently stores and manages data by focusing on the fact that the value of data changes pursuant to the lapse of time.

With this data lifecycle management, for instance, since it would be a waste of storage resources to store data of reduced value in an expensive physical device (FC disk or the like) in which high costs are expended to ensure reliability, responsiveness and durability, this kind of data of reduced value is migrated to an inexpensive physical device (SATA disk or the like) that is inferior to an expensive physical device.

Incidentally, an expensive physical device is used as the physical device 52 of the first disk array device 3 in the present operation example, and an inexpensive physical disk is used as the physical device 82 of the second disk array device 4.

Here, in this operation example, a case is considered where the storage system according to the present embodiment is applied to a billing log management system of email archive disks and telephone charges, and managing such billing log by switching the volume every month.

Figure 14:
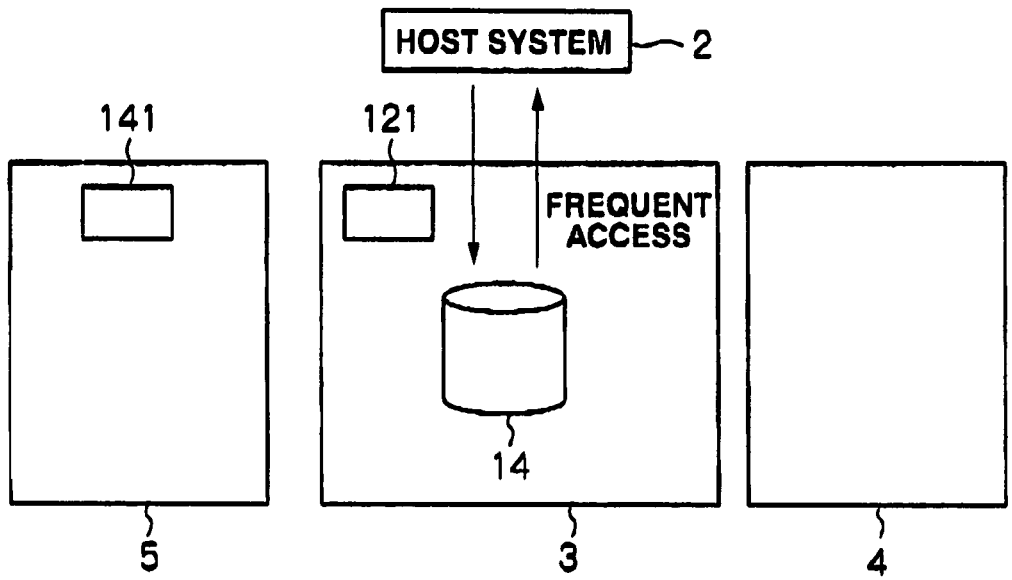
FIG. 14 is a conceptual diagram for explaining an operation example of the storage system.

Foremost, with the storage system 1, as shown in FIG. 14, a volume for storing the log data of the current month is created. Here, with respect to the volume for storing the log data of the current month, since a write access from the host system 2 will occur each time a user sends an email or makes a phone call, this will be the internal volume 14 set with the physical device 52 as the expensive physical device of the first disk array device 3. Like this, to use the internal volume 14 having high access performance as the volume for storing the log data of the current month would be appropriate from the perspective of data lifecycle management.

Specifically, the disk adapter 62 of the first disk array device 3, as evident from FIG. 1 to FIG. 4, sets the internal volume 14 with the physical device 52. And, the disk adapter 62 reads and writes log data from and in the internal volume 14 based on a command such as a write access or read access from the host system 2.

Nevertheless, in the following month, write access occurring each time the user sends an email or make a phone call will be lost, and only a rare read access from the host system 2 will occur; for instance, the user referring to past emails or telephone charges. Here, from the perspective of data lifecycle management, it would be appropriate to migrate the [log data] from the internal volume 14 set with the physical device 52 as the expensive physical device to the external volume 23 set with the physical device 82 as the inexpensive physical device even though the access performance thereof is inferior to the expensive physical device.

Figure 15:
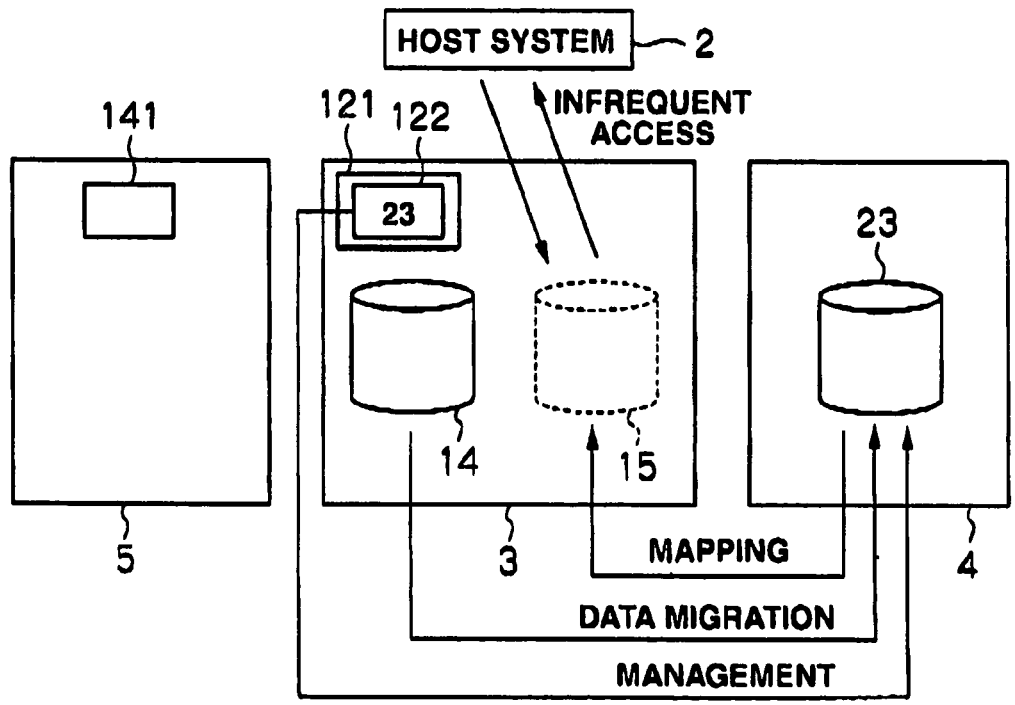
FIG. 15 is a conceptual diagram for explaining an operation example of the storage system.
Figure 16:
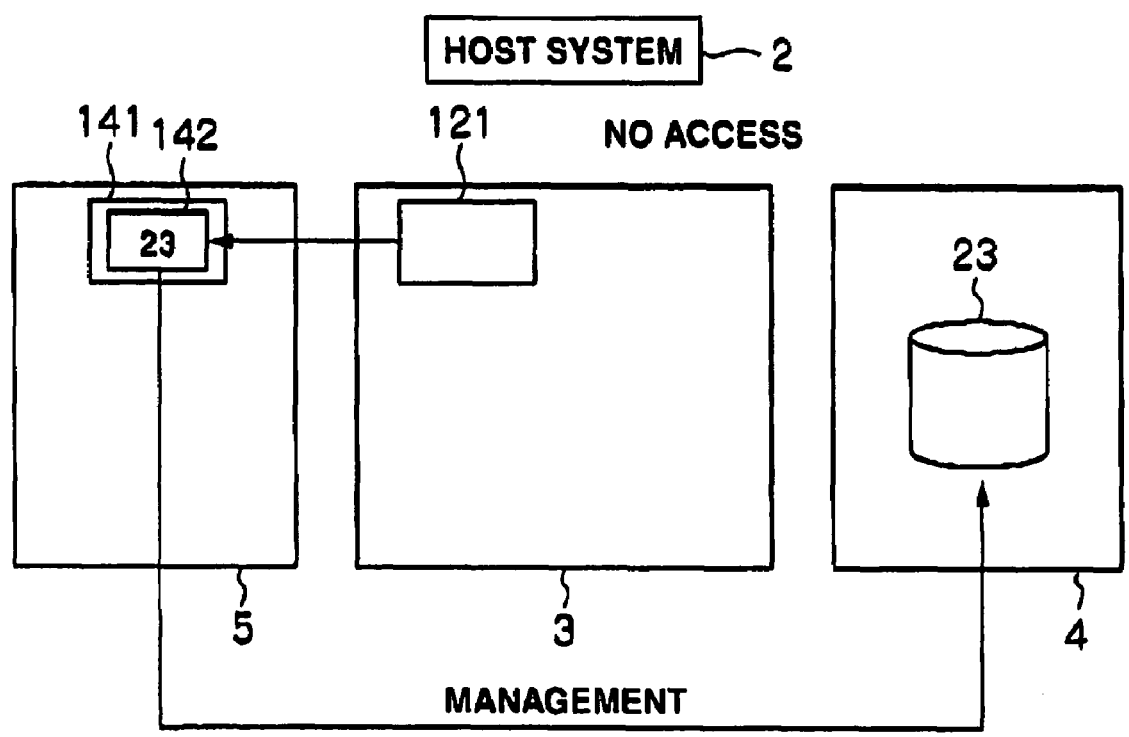
FIG. 16 is a conceptual diagram for explaining an operation example of the storage system.

Thus, with the storage system 1, as shown in FIG. 15, in the following month, the external volume 23 is automatically set, the log data stored in the internal volume 14 is migrated to the external volume 23, and the external volume 23 is mapped to the mapped volume 15.

Specifically, the disk adapter 92 of the second disk array device 4, as evident from FIG. 1 to FIG. 4, automatically sets the external volume 23 with the physical device 82 upon the lapse of a first period. Further, the disk adapter 62 of the first disk array device 3 reads the data stored in the internal volume 14 and transmits this data to the disk adapter 92 of the second disk array device 4. Further, the disk adapter 92 of the second disk array device 4 stores the data transmitted from the first disk array device 3 in the external volume 23. Moreover, the disk adapter 62 of the first disk array device 3 maps the external volume 23 storing the data to the mapped volume 15, creates the online volume information 102, and manages this online volume information 102 in the online volume information management table 101. And, the disk adapter 92 of the second disk array device 4 reads the log data from the external volume 23 based on a command such as the read access to be transmitted from the host system 2 via the first disk array device 3.

Further, after the lapse of one year or so, rare read accesses; for instance, the user referring to past emails or telephone charges are also ended, and there will be no access from the host system 2. Nevertheless, when this must be stored such that it can be input and output for a predetermined period based on compliance regulations and the like, from the perspective of data lifecycle management, offline volumization of the external volume 23 is automatically performed. Thereby, storage resources such as the cache memory 62 or shared memory 64 of the first disk array device 3 can be used in another internal volume 14 or external volume 23 (mapped volume 15). Further, since the location of the external volume 23 has been confirmed with the management terminal 5, this may be subject to online volumization instantaneously as necessary, and the host system 2 is able to refer to the external volume 23 in certain situations.

Specifically, the disk adapter 92 of the first disk array device 3, as evident from FIG. 1 to FIG. 4 and the offline volumization processing routine RT1 of FIG. 13, transmits to the management terminal 5 the offline volume information 122 based on the online volume information 102 managed with the online volume information management table 101 upon the lapse of a second period, and manages the offline volume information 122 in the offline volume information management table 121 of the management terminal 5.

Further, when it becomes necessary for the host system 2 to refer to the external volume 23 in certain situations, the CPU 71 of the management terminal 5, as evident from FIG. 1 to FIG. 4 and the online volumization processing routine RT2 of FIG. 13, manages the online volume information 102 based on the offline volume information 122 managed in the offline volume information management table 121 in the online volume information management table 101 of the first disk array device 3.

Like this, with the storage system 1, the internal volume 14 is set with the physical device of the first disk array device 3, the external volume 23 is set with the physical device 82 of the second disk array device 4 upon the lapse of a first period, data of the internal volume 14 is migrated to the external volume 23, and the online volume information 102 of the external volume 23 mapped to the mapped volume 15 is managed in the online volume information management table 101.

Thereafter, with the storage system 1, the offline volume information based on the online volume information 102 managed in the online volume information management table 101 is transmitted to the management terminal 5 upon the lapse of a second period, and this offline volume information 122 is managed in the offline volume information management table 121 of the management terminal 5.

Thereby, the storage system 1 is able to efficiently store and manage data, as well as prevent the waste of storage resources.

Incidentally, with the storage system 1, even when the data of the internal volume 14 is migrated to the external volume 23 upon the lapse of the first period, the volume to be the target of access from the host system 2 will not be changed before or after the migration, and the volume associated with the host system 2 is changed from the internal volume 14 to the mapped volume 15 in the first disk array device 3.

(1-3) Operation and Effect of First Embodiment

Like this, with the storage system 1 of the present embodiment, when an offline volumization order is received by the first disk array device 3, the online volume positional information 103 of the online volume information 102 managed in the online volume information management table 101 is extracted as the offline volume information 122, this offline volume information 122 is transmitted to the management terminal 5, and managed in the offline volume information management table 121 of the management terminal 5.

Accordingly, when this must be stored such that it can be input and output for a predetermined period based on compliance regulations and the like, the capacity to be secured in the cache memory 63 and shared memory 64 corresponding to the mapped volume can be released without having to secure the capacity corresponding to the mapped volume 15 in which the host system 2 will hot perform I/O processing of data, and the waste of storage resources can be prevented thereby.

Further, the capacity that was secured in the cache memory 63 and shared memory 64 by the external volume 23 of the online volume information 102 will be released, the secured area in the cache memory 63 and shared memory 64 can be reduced, and the reading and writing of data can be sped up thereby.

Moreover, it is not necessary to prepare the cache memory 63 and shared memory 64 of a capacity corresponding to all mapped volumes 15, and it will suffice to prepare the cache memory 63 and shared memory 64 of a capacity corresponding to the mapped volume 15 in which the host system 2 will perform I/O processing of data. Thus, large volumes of data can be handled with an appropriate cache memory 63 and shared memory 64.

(2) Second Embodiment

Figure 17:
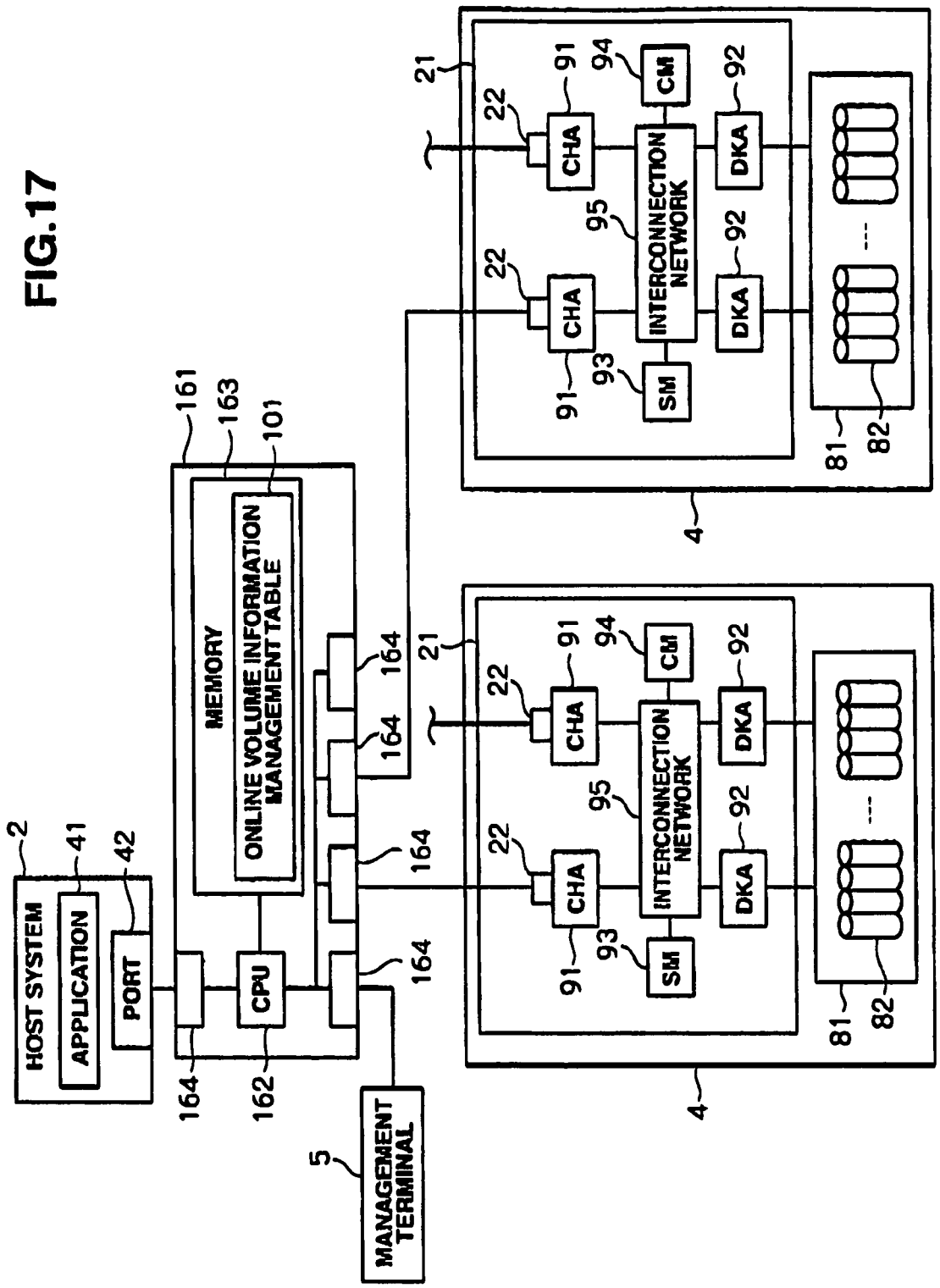
FIG. 17 is a schematic diagram showing a detailed configuration of the storage system according to the second.

FIG. 17 shows the configuration of a storage system 160 according to the second embodiment. This storage system 160 has a host system 2, a switch device 161, a second disk array device 4 and a management terminal 5.

This storage system 160 is configured the same as the storage system 1 in the first embodiment other than having the switch device 161 as a first communication network 31 and second communication network, not having a first disk array device, and the management terminal 5 managing the switch device 161.

As with the first disk array device in the first embodiment, this switch device 161 is capable of creating a mapped volume 15 by mapping the external volume 23 of the second disk array device 4 to the storage hierarchy of the switch device 161.

Therefore, as with the first disk array device in the first embodiment, the switch device 161 is able to incorporate the external volume 23 as its own internal volume, and provide this as an LU (Logical Unit) to the host system 2.

Incidentally, the switch device 161 may be a LAN switch configuring a LAN network, or a fibre channel switch configuring a SAN network.

Further still, the management terminal 5 is a management terminal for maintaining or managing the switch device 161. In the case of this embodiment, the management terminal 5, for instance, is able to set the logical device defined in the mapped volume 15 or change the RAID configuration. The management terminal 5, and the communication of commands or the like in the switch device 161 are prescribed in a SCSI protocol.

Specifically, the switch device 161 has a CPU 162, a memory 163 storing various control programs, and a port 164 for conducting the communication among the host system 2, second disk array device 4 and management terminal [5].

The memory 163 stores an online volume information management table 101 that stores a plurality of types of online volume information 102 of the external volume 23 mapped to the mapped volume 15.

And, with the storage system 160, the CPU 162 of the switch device 161 executes the offline volumization processing and online volume processing in the foregoing first embodiment in place of the disk adapter 62 of the first disk array device 3.

Like this, with the storage system 160 according to the present embodiment, when an offline volumization order is received by the switch device 161, the online volume positional information 103 of the online volume information 102 managed in the online volume information management table 101 is extracted as the offline volume information 122, this offline volume information 122 is transmitted to the management terminal 5, and managed in the offline volume information management table 121 of the management terminal 5, Accordingly, when this must be stored such that it can be input and output for a predetermined period based on compliance regulations and the like, the capacity to be secured in the memory 163 corresponding to the mapped volume 15 can be released without having to secure in the memory 163 the capacity corresponding to the mapped volume 15 in which the host system 2 will not perform I/O processing of data, and the waste of storage resources can be prevented thereby.

Further, the capacity that was secured in the memory 163 by the mapped volume 15 will be released, the secured area in the memory 163 can be reduced, and the reading and writing of data can be sped up thereby.

Moreover, it is not necessary to prepare the memory 163 of a capacity corresponding to all mapped volumes 15, and it will suffice to prepare the memory 163 of a capacity corresponding to the mapped volume 15 in which the host system 2 will perform I/O processing of data. Thus, large volumes of data can be handled with an appropriate memory 163.

The present invention may be employed in a storage system that virtualizes a volume of a certain disk array device in another disk array device, and in a storage system that uses equipment such as a switch device or management server upon virtualizing various types of storage areas.

What is claimed is:

1. A storage system comprising:
a first disk array device that provides a first volume,
wherein the first volume stores data transmitted from a host system;
a second disk array device that provides a second volume,
wherein the second volume is virtualized to a virtualized volume in said first disk array device; and
a management terminal that manages said first disk array device,
wherein said first disk array device comprises:
a first management unit that manages volume information of the virtualized volume that was virtualized in said first disk array device by being mapped with said second volume; and
a first transmission unit that transmits, based on an external operation, the volume information of said virtualized volume managed with said first management unit to said management terminal,
wherein said management terminal comprises:
a second management unit that manages the volume information of said virtualized volume transmitted from said first transmission unit,
wherein the first management unit comprises a cache memory,
wherein an online volume in which the host system will perform input/output processing of data is mapped to said virtualized volume, and an offline volume in which the host system will not perform the input/output processing of data is mapped to said virtualized volume, and
wherein a capacity secured in the cache memory corresponds to the online volume in which the host system will perform input/output processing of data, and does not correspond to the off line volume in which the host system will not perform input/output processing of data,
wherein said first disk array device further comprises:
a migration unit that migrates data of said first volume to a second volume,
wherein said first volume is set in a first physical device and said second volume is set in a second physical device,
wherein said migration unit migrates the data of said first volume to said second volume upon lapse of a first period,
wherein said first management unit manages the volume information of said virtualized volume corresponding to said second volume to which data was migrated with said migration unit,
wherein said first transmission unit transmits the volume information of said virtualized volume to said management terminal upon lapse of a second period, and
wherein said first disk array device: transmits the volume information of said virtualized volume corresponding to the second volume to the management terminal upon the lapse of the second period; deletes the transmitted volume information regarding the second volume from a storage area of the first management unit; and releases the capacity secured for the second volume in the cache memory.

2. The storage system according to claim 1,
wherein said first transmission unit transmits to said management terminal, from among the volume information of said virtualized volume, first positional information of said second disk array device set with said second volume mapped to said virtualized volume and second positional information of a physical device of said second disk array device; and wherein said second management unit manages the volume information of said virtualized volume transmitted from said first transmission unit.

3. The storage system according to claim 2, wherein said first disk array device further comprises:
 a connection status confirmation unit that confirms the connection status of said second volume mapped to said virtualized volume managed with said first management unit, and said first disk array device, and
 wherein said first management unit manages the connection status information of said second volume and said first disk array device, and the first positional information of said virtualized volume as the volume information of said virtualized volume.

4. The storage system according to claim 2, wherein the first positional information and the second positional information comprise:
 a port number of an initiator port of the first disk array device;
 a port number of a target port of the second disk array device;
 a logical unit number of the second volume;
 a device serial number of the second disk array device;
 a configuration number that represents a number stored in a configuration file of a connectable device;
 a first device identifier and a second device identifier that identify logical devices of the second volume;
 a device name of the second disk array device;
 a maximum LBA (logical block address) information that indicates the capacity of the second volume; and
 device type information that represents a type of physical device.

5. The storage system according to claim 3, wherein said management terminal further comprises:
 a second transmission unit that transmits, based on an external operation, third positional information of said virtualized volume managed with said second management unit to said first disk array device,
 wherein said connection status confirmation unit confirms the connection status of said second volume corresponding to the third positional information of said virtualized volume transmitted by said second transmission unit, and said first disk array device, and
 wherein said first management unit manages the third positional information of said virtualized volume transmitted by said second transmission unit, and the connection status information of said second volume and said first disk array device as the volume information of said virtualized volume.

6. The storage system according to claim 1,
 wherein said first transmission unit transmits to said second disk array device a power shutoff order of said second volume corresponding to the volume information of said virtualized volume transmitted to said management terminal, and
 wherein said second disk array device comprises a power source controller for shutting off the power of said second volume based on said power shutoff order transmitted from said first transmission unit.

7. The storage system according to claim 6,
 wherein said first transmission unit transmits to said second disk array device a power supply order of said second volume corresponding to the volume information of said virtualized volume transmitted from said management terminal, and wherein said power source controller supplies power to said second volume based on said power supply order transmitted by said first transmission unit.

8. The storage system according to claim 1,
 wherein said management terminal further comprises:
  an input unit that inputs volume information of a scheduled virtualized volume that is not yet mapped with said second volume, but is scheduled to be virtualized in said first disk array device; and
 wherein said second management unit manages the volume information of said scheduled virtualized volume input with said input unit.

9. A management method of a storage system having a first disk array device that provides a first volume, wherein the first volume stores data transmitted from a host system, a second disk array device that provides a second volume that is virtualized to a virtualized volume in said first disk array device, and a management terminal that manages said first disk array device, said method comprising:
 a first step of managing, by a first management unit, volume information of the virtualized volume that was virtualized in said first disk array device by being mapped with said second volume;
 a second step of transmitting, based on an external operation, the volume information of said virtualized volume managed with said first management unit at said first step to said management terminal; and
 a third step of managing, by a second management unit, the volume information of said virtualized volume transmitted at said second step,
 wherein the first management unit comprises a cache memory,
 wherein the virtualized volume includes an online volume in which the host system will perform input/output processing of data, and an offline volume in which the host system will not perform the input/output processing of data,
 wherein a capacity secured in the cache memory corresponds to the online volume in which the host system will perform input/output processing of data, and does not correspond to the off line volume in which the host system will not perform input/output processing of data,
 wherein said first step further comprises, upon lapse of a first period, migrating data of said first volume to a second volume, wherein said first volume is set in a first physical device, and said second volume is set in a second physical device, and managing the volume information of said virtualized volume corresponding to said second volume to which said data was migrated,
 wherein said second step further comprises, upon lapse of a second period, transmitting the volume information of said virtualized volume to said management terminal, and
 wherein said first disk array device: transmits the volume information of said virtualized volume corresponding to the second volume to the management terminal upon the lapse of the second period; deletes the transmitted volume information regarding the second volume from a storage area of the first management unit; and releases the capacity secured for the second volume in the cache memory.

10. The management method of a storage system according to claim 9,
 wherein said second step further comprises transmitting to said management terminal, from among the volume information of said virtualized volume, first positional information of said second disk array device set with said second volume mapped to said virtualized volume and second positional information of a physical device of said second disk array device, and wherein said third step further comprises managing the volume information of said virtualized volume transmitted at said second step.

11. The management method of a storage system according to claim 10, wherein said first further comprises confirming the connection status of said second volume mapped to said virtualized volume managed with said first management unit, and said first disk array device; and managing the connection status information of said second volume and said first disk array device, and the positional information of said virtualized volume as the volume information of said virtualized volume.

12. The management method according to claim 10, wherein the first positional information and the second positional information comprise a port number of an initiator port of the first disk array device, a port number of a target port of the second disk array device, a logical unit number of the second volume, a device serial number of the second disk array device, a configuration number that represents a number stored in a configuration file of a connectable device, a first device identifier and a second device identifier that identify logical devices of the second volume, a device name of the second disk array device, a maximum LBA (logical block address) information that indicates the capacity of the second volume, and device type information that represents a type of physical device.

13. The management method of a storage system according to claim 11, further comprising:

a fourth step of transmitting, based on an external operation, third positional information of said virtualized volume managed with said second management unit to said first disk array device;

a fifth step of confirming the connection status of said second volume corresponding to the third positional information of said virtualized volume transmitted in said fourth step, and said first disk array device; and a sixth step of managing the third positional information of said virtualized volume transmitted at said fourth step, and the connection status information of said second volume and said first disk array device confirmed in said fifth step as the volume information of said virtualized volume.

14. The management method of a storage system according to claim 9, wherein said second step further comprises transmitting a power shutoff order of said second volume corresponding to the volume information of said virtualized volume transmitted to said management terminal to said second disk array device, and wherein the power of said second volume is shut off based on said transmitted power shutoff order.

15. The management method of a storage system according to claim 14, wherein said fifth step further comprises transmitting a power supply order of said second volume corresponding to the volume information of said virtualized volume transmitted in said fourth step to said second disk array, and wherein power is supplied to said second volume based on said transmitted power supply order.

16. The management method of a storage system according to claim 9, wherein said third step further comprises inputting volume information of a scheduled virtualized volume that is not yet mapped with said second volume, but is scheduled to be virtualized in said first disk array device; and managing the volume information of said input scheduled virtualized volume.

17. A storage system comprising:

a disk array device comprising a plurality of volumes that store data transmitted from a host system;

a switch device that transmits said data from said host system to said disk array device; and a management terminal connected to said switch device, wherein said switch device comprises:

a virtualized volume to be provided to said host system; and a management unit, wherein said plurality of volumes of said disk array device include an online volume mapped to said virtualized volume and an offline volume mapped to said virtualized volume, wherein said management unit manages information relating to said online volume, wherein said management terminal manages information relating to said offline volume, wherein the management unit comprises a cache memory, wherein the host system performs input/output processing of data in said online volume, and the host system does not perform the input/output processing of data in said offline volume, and wherein a capacity secured in the cache memory corresponds to the online volume in which the host system performs input/output processing of data, and does not correspond to the offline volume in which the host system does not perform input/output processing of data, wherein said first disk array device further comprises:

a first volume;

a transmission unit; and a migration unit that migrates data of said first volume to said second volume, wherein said first volume is set in a first physical device and said second volume is set in a second physical device, wherein said migration unit migrates the data of said first volume to said second volume upon lapse of a first period, wherein said management unit manages volume information of said virtualized volume corresponding to said second volume to which data was migrated with said migration unit, and wherein said transmission unit transmits the volume information of said virtualized volume to said management terminal upon lapse of a second period, and wherein said first disk array device: transmits the volume information of said virtualized volume corresponding to the second volume to the management terminal upon the lapse of the second period; deletes the transmitted volume information regarding the second volume from a storage area of the management unit; and releases the capacity secured in the cache memory.

18. A storage system comprising:

a first disk array device connected to a host system;

a second disk array device to be connected to said first disk array device; and a management terminal to be connected to said first disk array device, wherein said first disk array device comprises:

a plurality of virtualized volumes to be provided to the host system and a management unit, wherein said second disk array device comprises an online volume mapped to a virtualized volume of said plurality of virtualized volumes, and an offline volume not mapped to any of said plurality of virtualized volumes, wherein information relating to said online volume is managed with said management unit, and wherein information relating to said offline volume is managed with said management terminal, wherein the management unit comprises a cache memory, wherein the host system performs input/output processing of data in said online volume, and the host system does not perform the input/output processing of data in said offline volume, and wherein a capacity secured in the cache memory corresponds to the online volume in which the host system performs input/output processing of data, and does not correspond to the offline volume in which the host system does not perform input/output processing of data, wherein said first disk array device further comprises:

a first volume;

a transmission unit; and a migration unit that migrates data of said first volume to said second volume, wherein said first volume is set in a first physical device, and said second volume is set in a second physical device, wherein said migration unit migrates the data of said first volume to said second volume upon lapse of a first period, wherein said management unit manages volume information of said virtualized volume corresponding to said second volume to which data was migrated with said migration unit, and wherein said transmission unit transmits the volume information of said virtualized volume to said management terminal upon lapse of a second period, and wherein said first disk array device: transmits the volume information of said virtualized volume corresponding to the second volume to the management terminal upon the lapse of the second period; deletes the transmitted volume information regarding the second volume from a storage area of the management unit; and releases the capacity secured in the cache memory.

* * * * *